US007104891B2

(12) United States Patent
Osako et al.

(10) Patent No.: US 7,104,891 B2
(45) Date of Patent: Sep. 12, 2006

(54) GAME MACHINE AND GAME PROGRAM FOR DISPLAYING A FIRST OBJECT CASTING A SHADOW FORMED BY LIGHT FROM A LIGHT SOURCE ON A SECOND OBJECT ON A VIRTUAL GAME SPACE

(75) Inventors: Satoru Osako, Kyoto (JP); Naoya Morimura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 309 days.

(21) Appl. No.: 10/288,303

(22) Filed: Nov. 6, 2002

(65) Prior Publication Data

US 2003/0216175 A1 Nov. 20, 2003

(30) Foreign Application Priority Data

May 16, 2002 (JP) .............................. 2002-141635

(51) Int. Cl.
*G07F 13/00* (2006.01)
(52) U.S. Cl. .......................................... 463/32; 463/31
(58) Field of Classification Search .............. 463/9–43; 345/421–427
See application file for complete search history.

(56) References Cited

U.S. PATENT DOCUMENTS

| | | | | |
|---|---|---|---|---|
| 4,600,200 | A * | 7/1986 | Oka et al. ....................... | 463/33 |
| 5,577,175 | A * | 11/1996 | Naka et al. .................. | 345/427 |
| 5,914,721 | A * | 6/1999 | Lim ............................ | 345/421 |
| 5,936,626 | A |  8/1999 | Beasley | |
| 5,947,823 | A * | 9/1999 | Nimura ........................ | 463/32 |
| 6,320,580 | B1 * | 11/2001 | Yasui et al. .................. | 345/421 |
| 6,322,448 | B1 * | 11/2001 | Kaku et al. .................... | 463/32 |
| 6,356,264 | B1 * | 3/2002 | Yasui et al. .................. | 345/426 |
| 6,384,822 | B1 * | 5/2002 | Bilodeau et al. ............. | 345/422 |
| 6,437,782 | B1 * | 8/2002 | Pieragostini et al. ....... | 345/426 |
| 6,482,090 | B1 * | 11/2002 | Rimoto et al. ................. | 463/31 |
| 6,529,194 | B1 * | 3/2003 | Yamaguchi ................... | 345/426 |
| 6,572,475 | B1 * | 6/2003 | Okabe et al. .................. | 463/30 |
| 6,589,117 | B1 * | 7/2003 | Moritome et al. ............. | 463/37 |
| 6,624,833 | B1 * | 9/2003 | Kumar et al. ................ | 345/863 |
| 6,646,640 | B1 * | 11/2003 | Nagy .......................... | 345/426 |
| 6,667,741 | B1 * | 12/2003 | Kataoka et al. ............. | 345/426 |
| 6,676,518 | B1 * | 1/2004 | Sawa et al. .................... | 463/31 |

(Continued)

OTHER PUBLICATIONS

Cass Everitt et al.. "Practical and Robust Stencied Shadow Volumes for Hardware-Accelerated Rendering". Mar. 12, 2002, NVIDIA Corporation. [online], [retrieved on Mar. 10, 2005] Retrieved from the Internet <URL:http://www.developer.nvidia.com>.*

(Continued)

*Primary Examiner*—Julie Brocketti
(74) *Attorney, Agent, or Firm*—Nixon & Vanderhye, P.C.

(57) ABSTRACT

A partial shadow volume having a predetermined height defined by a contour of a character object and light coming from a light source is formed based on undulations of a land object, and is then stored in advance in a DVD-ROM or the like. A CPU reads this partial shadow volume for placing the partial shadow volume at a point of intersection of the land object and a line extending from character object placement coordinates to a light direction. The placed partial shadow volume is rendered by using the stencil buffer. Based on values in the stencil buffer, a shadow of the character object cast on the land object is rendered. Thus, a realistic shadow can be rendered with a reduced processing load for shadow rendering processing.

34 Claims, 18 Drawing Sheets

U.S. PATENT DOCUMENTS

| | | | |
|---|---|---|---|
| 6,677,946 B1* | 1/2004 | Ohba ........................ | 345/426 |
| 6,712,700 B1* | 3/2004 | Imai et al. .................... | 463/31 |
| 6,717,575 B1* | 4/2004 | Hino et al. ................ | 345/418 |
| 6,744,430 B1* | 6/2004 | Shimizu .................... | 345/410 |
| 6,771,265 B1* | 8/2004 | Shimono ................... | 345/426 |
| 6,791,544 B1* | 9/2004 | Hong et al. ................ | 345/426 |
| 6,856,321 B1* | 2/2005 | Tsukizaki et al. .......... | 345/582 |
| 2002/0036638 A1* | 3/2002 | Higashiyama ............. | 345/426 |
| 2003/0228905 A1 | 12/2003 | Osako | |

OTHER PUBLICATIONS

Cass Everitt et al.. "Practical and Robust Stencied Shadow Volumes for Hardware-Accelerated Rendering". Presentation NVIDIA Corporation. [online], [retrieved on Mar. 10, 2005] Retrieved from the Internet <URL:http://www.developer.nvidia.com>.*

Jonathan Blow, "Terrain Rendering at High Levels of Detail". Advanced Terrain Visualization System. Bolt Action Software. Mar. 11, 2000. [online] , [retrieved on Mar. 10, 2005].*

Razvan Surdulescu, "Cg Shadow Volumes". [online], [retrieved on Mar. 10, 2005] Retrieved from the Internet <URL:http://www.gamevedeev.net/reference/articles/article1990.asp>.*

"Robust Shadow Volumes", [online]. [retrieved on Mar. 10, 2005] Retrieved fromn the Internet <URL:http://developer.nvidia.con/object/robust_shadow_voludmes.html>.*

Tim Heidmann, "Real Shadows", Number Eighteen. IRIS Universe. [online]. [retrieved on Mar. 10, 2003]. Retrieved from the Internet <URL:http://www.developer.nvidia.con/object/robust_shadow_voludmes.html>.*

"Lighting". Apr. 6, 2001. [online]. [retrieved on Mar. 10, 2005]. Retrieved from the Internet <URL:http:www.vterrain.org/Performance/lighting>.*

\* cited by examiner

F I G. 1
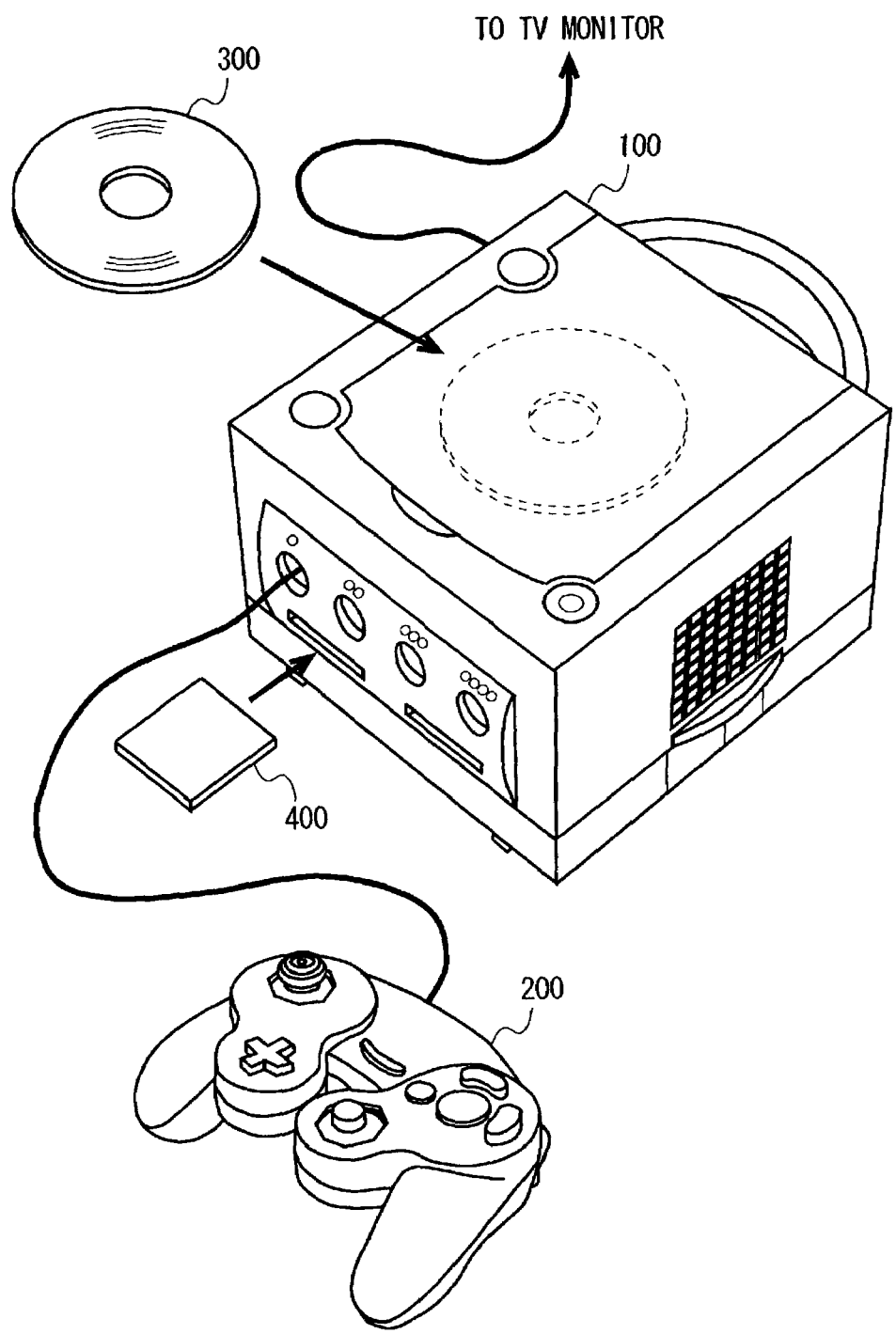

F I G. 1 7
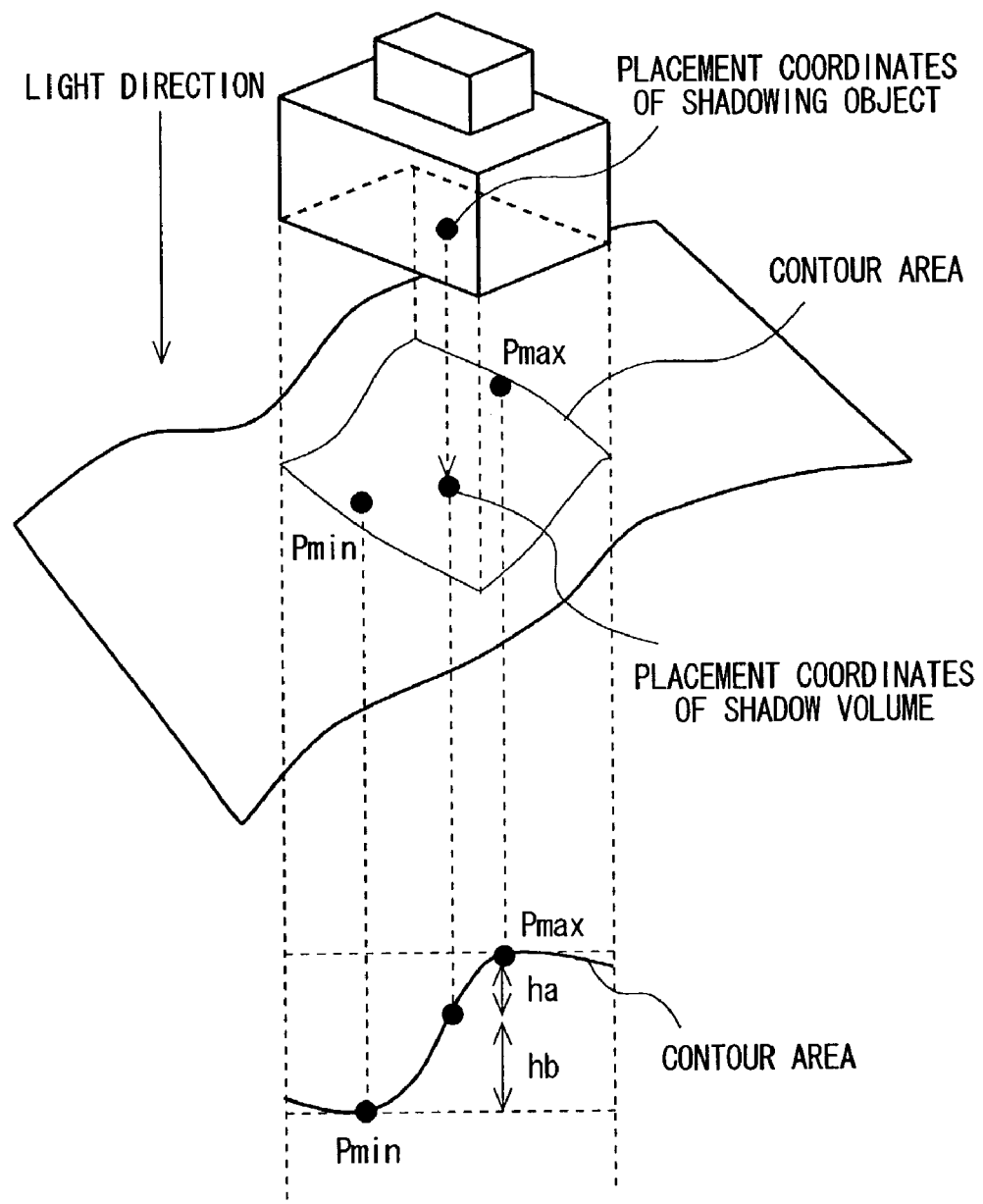

GAME MACHINE AND GAME PROGRAM FOR DISPLAYING A FIRST OBJECT CASTING A SHADOW FORMED BY LIGHT FROM A LIGHT SOURCE ON A SECOND OBJECT ON A VIRTUAL GAME SPACE

BACKGROUND

The technology described herein relates to game machines and game programs. More specifically, the technology described herein relates to a game machine and a game program for carrying out game processing to display a state in which a first object casts a shadow formed by light from a light source on a second object in a virtual three-dimensional (3-D) game space.

When computers for computer graphics perform computer graphics processing such as shadow processing, techniques such as ray tracing and radiosity have been used to achieve computer graphics with realistic shadows.

When game machines performs 3-D game processing, a game image has to be generated within one frame ($\frac{1}{30}$ second or $\frac{1}{60}$ second). Therefore, time-consuming computer graphics processing cannot be introduced to 3-D game processing. To present shadows of characters in a 3-D game space, shadow images (or shadow polygons) are often provided in advance to conventional game machines, and are placed where appropriate, such as under the characters. However, such shadow images can hardly achieve realistic shadows.

In recent years, highly-improved performance of the game machines has enabled shadow processing such as shadow mapping and shadow volume techniques. Therefore, shadows that are more realistic than those in conventional art can be displayed.

In the shadow mapping technique, a shadow is rendered in the following steps 1 to 5:

(Step 1) Take a position of a light source in game space as a viewpoint, and store depth information of objects viewed from the viewpoint in a table.

(Step 2) Render the objects viewed from a rendering viewpoint, and store depth information of the objects viewed from the rendering viewpoint in a Z buffer.

(Step 3) Formulate a transformation equation for transforming a point on a screen with reference to positional information thereof for comparison with depth information corresponding to the point stored in the table in step 1.

(Step 4) Use the equation formulated in step 3 to compare the depth information of the point and the corresponding depth information stored in the table in step 1. If they are not equal in value, there is a light-obstructive object between the point and the light source. In this case, perform processing for decreasing luminance.

(Step 5) Perform the processing of step 4 for every point on the screen.

In the above shadow mapping technique, performing various processing such as depth information generation based on the light source and copy processing is required. With hardware whose frequency band for memory transfer is narrow, such processing occupies a bus in the hardware, thereby leading to an increase in processing load. Moreover, additional memory for storing the depth information is required.

In the shadow volume technique, a shadow is rendered as follows. First, a contour of an object is extended in a direction of light from a light source in a game space to obtain a shadowed space (shadow volume). Then, front faces and back faces of the shadowed space are rendered by, for example, using a stencil buffer, to obtain an area where the shadow is actually cast. Then, the shadow is rendered on an area of the game image corresponding to the obtained area.

In the above shadow volume technique, extracting the contour of the object and generating a shadowed space extended from the contour in the light direction require a large amount of processing load. Also, rendering the entire shadowed space by using the stencil buffer requires a large amount of processing load.

That is, even with highly-improved performance of game machines, the large processing load required for generating realistic game images still impairs an entertaining aspect in gameplay. Therefore, it is desirable to achieve processing for generating realistic images with less processing load.

SUMMARY OF PRESENT NON-LIMITING EXEMPLARY EMBODIMENTS

Therefore, a feature of present non-limiting exemplary embodiments is to provide a game machine and a game program capable of rendering a realistic shadow with less processing load.

Present non-limiting exemplary embodiments may include the following features to attain the feature mentioned above. Note that reference numbers or step numbers in parentheses merely indicate the relation to the embodiment that will be described below for better understanding, and do not restrict the scope of each aspect.

According to a first aspect of the non-limiting exemplary embodiments, a game machine carries out game processing to display a state in which a first object (character object) casts a shadow formed by light from a light source on a second object (land object) in a virtual three-dimensional game space. The game machine includes partial shadow volume storage locations (DVD-ROM 300 or RAM of the game machine body); partial shadow volume placing processing mechanism (CPU 10 executing step S1106; hereinafter only step numbers are shown); and shadow rendering processing mechanism (S1302). The partial shadow volume storage locations store a partial shadow/volume formed based on the contour of the first object and a direction of the light from the light source. The height of the partial shadow volume in the direction of the light is based on undulations of the second object. The partial shadow volume placing processing mechanism places the partial shadow volume at shadow volume placement coordinates. The shadow rendering processing mechanism renders the shadow of the first object cast on the second object based on the partial shadow volume placed by the partial shadow volume placing processing mechanism.

In the first aspect, shadow rendering processing is performed by using the partial shadow volume having a predetermined height. Therefore, a realistic shadow can be rendered with reduced processing load required for shadow rendering processing.

According to a second aspect of the non-limiting exemplary embodiments, the partial shadow volume placing processing mechanism further includes shadow volume placement coordinates calculator (S1201 through S1205). The shadow volume placement coordinates calculator calculates, as the shadow volume placement coordinates, a point of intersection of a line extending from predetermined coordinates on the first object in the direction of the light and the second object.

According to a third aspect of the non-limiting exemplary embodiments, the height of the partial shadow volume is determined so that, even when a shadowed area of the second object cast with the shadow of the first object is arbitrarily varied in the course of a game, the entire shadowed area is always included inside the partial shadow volume.

In the third aspect, even when the shadowed area is varied in position, size, or shape in the course of the game, a shadow can be always correctly rendered.

According to a fourth aspect of the non-limiting exemplary embodiments, the height of the partial shadow volume is defined by a first height (ha) in a direction toward the light source with reference to the shadow volume placement coordinates, and a second height (hb) in a direction away from the light source with reference to the shadow volume placement coordinates. The first height and the second height are determined so that, even when a shadowed area of the second object cast with the shadow of the first object is arbitrarily varied in the course of a game, the entire shadowed area is always included inside the partial shadow volume, and that the first height and the second height are minimum.

In the fourth aspect, the partial shadow volume to be provided has minimum-required heights in both the direction toward the light source and the direction away from the light source. Therefore, processing load required for shadow rendering processing can be optimally reduced.

According to a fifth aspect of the non-limiting exemplary embodiments, the first height is determined based on a maximum undulation (a maximum value of ha1, ha2, ha3, ..., haN) of the shadowed area that is arbitrarily varied in the course of the game in the direction toward the light source with reference to the shadow volume placement coordinates. The second height is determined based on a maximum undulation (a maximum value of hb1, hb2, hb3, ... hbN) of the shadowed area that is arbitrarily varied in the course of the game in the direction away from the light source with reference to the shadow volume placement coordinates.

In the fifth aspect, the minimum-required first and second heights of the partial shadow volume can be determined.

According to a sixth aspect of the non-limiting exemplary embodiments, the first height and the second height are commonly determined based on a maximum undulation (a maximum value of H1, H2, H3, ..., HN) of the shadowed area that is arbitrarily varied in the course of the game.

In the sixth aspect, the required height of the partial shadow volume can be easily determined.

According to a seventh aspect of the non-limiting exemplary embodiments, the partial shadow volume storage locations stores the partial shadow volume formed in advance of the game processing based on the undulations of the second object.

In the seventh aspect, the partial shadow volume does not have to be generated in game processing. Therefore, processing load required for game processing can be reduced.

According to an eighth aspect of the non-limiting exemplary embodiments, the game machine further includes maximum undulation calculator (S1802, S2002, S2003) and partial shadow volume generator (S1803, S2004). The maximum undulation calculator calculates a maximum undulation of a shadowed area of the second object cast with the shadow of the first object. The partial shadow volume generator generates the partial shadow volume having a height corresponding to the maximum undulation calculated by the maximum undulation calculating means, and causes the partial shadow volume to be stored in the partial shadow volume storage locations.

In the eighth aspect, the partial shadow volume having the minimum-required height based on the maximum undulation of the shadowed area can be generated when appropriate.

According to a ninth aspect of the non-limiting exemplary embodiments, the maximum undulation calculator detects maximum coordinates (Pmax) of the shadowed area that are furthest from the shadow volume placement coordinates in the direction toward the light source and minimum coordinates (Pmin) of the shadowed area that are furthest from the shadow volume placement coordinates in the direction away from the light source, and determines the height of the partial shadow volume based on the detected maximum coordinates and the detected minimum coordinates.

According to a tenth aspect of the non-limiting exemplary embodiments, the game machine further includes contour polygon storage locations (DVD-ROM 300 or RAM of the game machine body). The contour polygon storage locations store a contour polygon corresponding to a contour of the first object projected in the direction of the light. The maximum undulation calculator detects the maximum coordinates and the minimum coordinates by placing the contour polygon at the shadow volume placement coordinates, and then shifting the contour polygon to the direction of the light and the direction opposite from the direction of the light.

In the tenth aspect, the maximum undulation of the shadowed area can be calculated without calculating the contour area (shadowed area) of the first object on the second object. Therefore, processing load required for partial shadow volume generation processing can be reduced.

According to an eleventh aspect of the non-limiting exemplary embodiments, the game machine further includes contour polygon generator. The contour polygon generator generates the contour polygon based on the contour of the first object and the light coming from the light source, and causes the contour polygon to be stored in the contour polygon storage locations.

In the eleventh aspect, the contour polygon can be generated when appropriate according to situations for use.

According to a twelfth aspect of the non-limiting exemplary embodiments, a game program is executed on a game machine for carrying out game processing to display a state in which a first object casts a shadow formed by light from a light source on a second object in a virtual three-dimensional game space. The game program causes the game machine to execute steps including a partial shadow volume reading step (S1206), a partial shadow volume placing step, and a shadow rendering step. In the partial shadow volume reading step, a partial shadow volume formed based on a contour of the first object and a direction of the light from the light source is read. The partial shadow volume has a predetermined height in the direction of the light based on undulations of the second object. In the partial shadow volume placing step, the partial shadow volume is placed at shadow volume placement coordinates. In the shadow rendering step, the shadow of the first object cast on the second object is rendered based on the partial shadow volume placed in the partial shadow volume placing step.

In the twelfth aspect, shadow rendering processing is performed by using the partial shadow volume having a predetermined height. Therefore, a realistic shadow can be rendered with reduced processing load required for shadow rendering processing.

According to a thirteenth aspect of the non-limiting exemplary embodiments, the partial shadow volume placing step further includes a shadow volume placement coordinate calculating step. In the shadow volume placement coordinate calculating step, a point of intersection of a line extending from predetermined coordinates on the first object in the direction of the light and the second object is calculated as the shadow volume placement coordinates.

According to a fourteenth aspect of the non-limiting exemplary embodiments, the height of the partial shadow volume is determined so that, even when a shadowed area of the second object cast with the shadow of the first object is arbitrarily varied in the course of a game, the entire shadowed area is always included inside the partial shadow volume.

According to a fifteenth aspect of the non-limiting exemplary embodiments, the height of the partial shadow volume is defined by a first height in a direction toward the light source with reference to the shadow volume placement coordinates and a second height in a direction away from the light source with reference to the shadow volume placement coordinates. The first height and the second height are determined so that, even when a shadowed area of the second object cast with the shadow of the first object is arbitrarily varied in the course of a game, the entire shadowed area is always included inside the partial shadow volume, and that the first height and the second height are minimum.

According to a sixteenth aspect of the non-limiting exemplary embodiments, the first height is determined based on a maximum undulation of the shadowed area that is arbitrarily varied in the course of the game in the direction toward the light source with reference to the shadow volume placement coordinates. The second height is determined based on a maximum undulation of the shadowed area that is arbitrarily varied in the course of the game in the direction away from the light source with reference to the shadow volume placement coordinates.

According to a seventeenth aspect of the non-limiting exemplary embodiments, the first height and the second height are commonly determined based on a maximum undulation of the shadowed area that is arbitrarily varied in the course of the game.

According to an eighteenth aspect of the non-limiting exemplary embodiments, in the partial shadow volume reading step, the partial shadow volume formed in advance of the game processing based on the undulations of the second object is read.

According to a nineteenth aspect of the non-limiting exemplary embodiments, the game program causes the game machine to further execute steps including a maximum undulation calculating step and a partial shadow volume generating step. In the maximum undulation calculating step, a maximum undulation of a shadowed area of the second object cast with the shadow of the first object is calculated. In the partial shadow volume generating step, the partial shadow volume having a height corresponding to the maximum undulation calculated in the maximum undulation calculating step is generated and temporarily stored, and the partial shadow volume is caused to be read in the partial shadow volume reading step.

According to a twentieth aspect of the non-limiting exemplary embodiments, in the maximum undulation calculating step, maximum coordinates of the shadowed area that are furthest from the shadow volume placement coordinates in the direction toward the light source and minimum coordinates of the shadowed area that are furthest from the shadow volume placement coordinates in the direction away from the light source are detected. Based on the detected maximum coordinates and the detected minimum coordinates, the height of the partial shadow volume is determined.

According to a twenty-first aspect of the non-limiting exemplary embodiments, the game program causes the game machine to further execute a contour polygon reading step (S2001). In the contour polygon reading step, a contour polygon corresponding to a contour of the first object projected in the direction of the light is read. In the maximum undulation calculating step, the maximum coordinates and the minimum coordinates are detected after the contour polygon is placed at the shadow volume placement coordinates. Then, the contour polygon is shifted to the direction of the light and the direction opposite from the direction of the light.

According to a twenty-second aspect of the non-limiting exemplary embodiments, the game program causes the game machine to further execute a contour polygon generating step. In the contour polygon generating step, the contour polygon based on the contour of the first object and the light coming from the light source is generated and temporarily stored. The contour polygon is caused to be read in the contour polygon reading step.

These and other objects, features, aspects and advantages of the non-limiting exemplary embodiments will become more apparent from the following detailed description of the non-limiting exemplary embodiments when taken in conjunction with the accompanying drawings.

BRIEF DESCRIPTION OF THE DRAWINGS

FIG. 1 is an external view of a game system according to one non-limiting exemplary embodiment;

FIG. 17 is an illustration for describing how to generate a shadow volume in a first exemplary modification;

DESCRIPTION OF NON-LIMITING EXEMPLARY EMBODIMENTS

Figure 2:
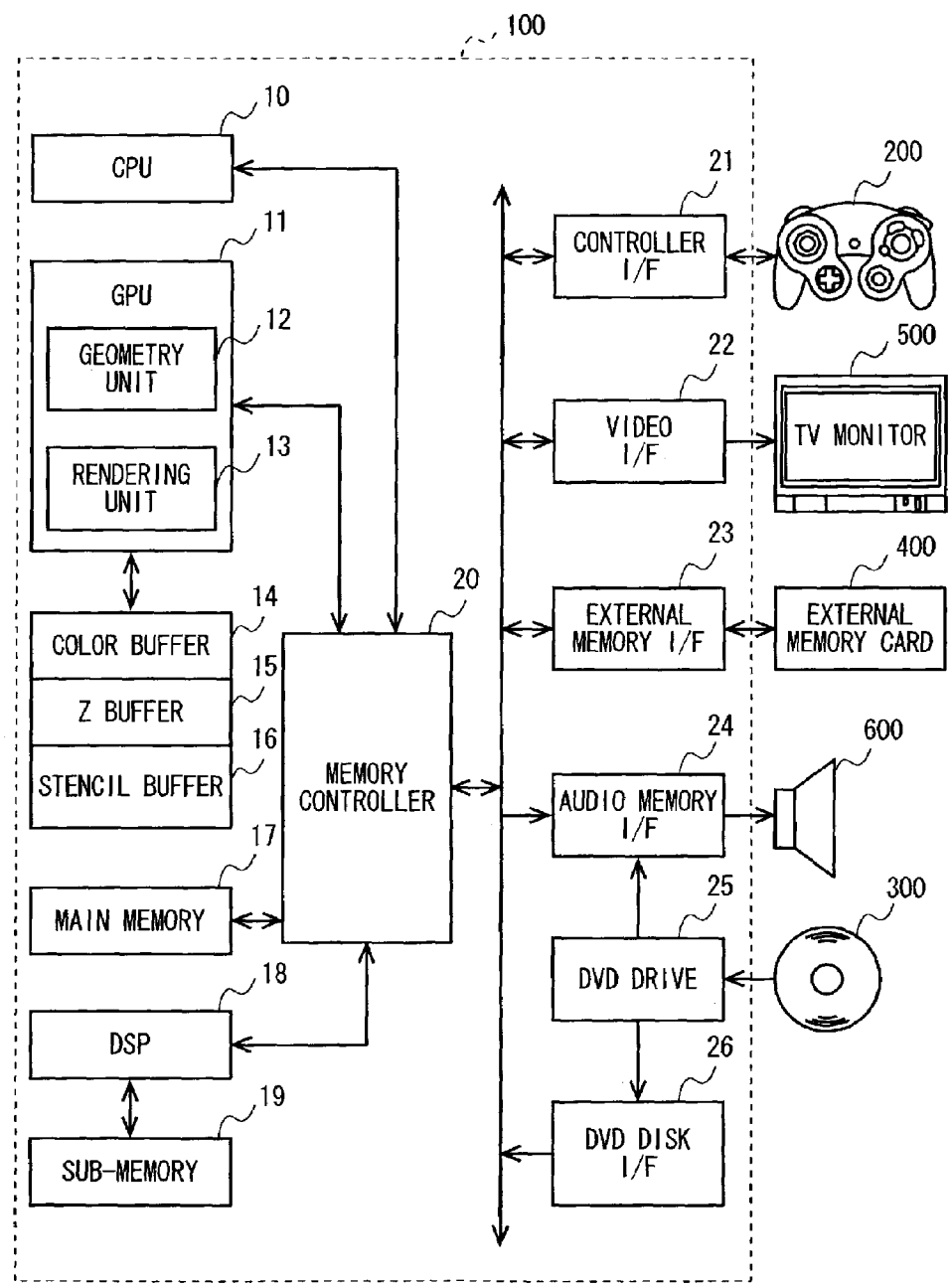
FIG. 2 is a block diagram illustrating the configuration of the game system.

FIG. 1 is an external view of the configuration of a game system according to one exemplary embodiment, and FIG. 2 is a block diagram illustrating the configuration of the game system. As illustrated in FIGS. 1 and 2, the game system includes a game machine body 100, a DVD-ROM 300, an external memory card 400, a controller 200, a loudspeaker 600, and a TV monitor 500. The DVD-ROM 300 and the external memory card 400 are removably inserted in the game machine body 100. The controller 200 is connected to any one of a plurality (four in FIG. 1) of a controller port connectors provided on the game machine body 100 via a communications cable. The TV monitor 500 and the loudspeaker 600 are connected to the game machine body 100 via AV cables or the like. Alternatively, communications between the game machine body 100 and the controller 200 may be carried out wirelessly. With reference to FIG. 2, the components of the game system are described below in more detail.

The DVD-ROM 300 fixedly stores game-related data such as a game program and character data. When the player plays the game, the DVD-ROM 300 is inserted in the game machine body 100. Instead of the DVD-ROM 300, another external storage medium may be used, such as a CD-ROM, a magneto-optical (MO) disk, a memory card, or a ROM cartridge, as a means for storing the game-related data.

The external memory card 400 is composed of a rewritable storage medium, such as a flash memory, for storing data such as save data in the course of the game.

The game machine body 100 reads the game program stored in the DVD-ROM 300 for carrying out game processing.

The controller 200 is an input device for the player to enter inputs associated with game operations, and is provided with a plurality of operation switches. The controller 200 outputs operation data to the game machine body 100 according to which operation switch is pressed by the player, for example.

The TV monitor 500 displays image data output from the game machine body 100 on a screen. The loudspeaker 600 is typically incorporated in the TV monitor 500 for producing sound in the game output from the game machine body 100.

The structure of the game machine body 100 is described below. In FIG. 2, the game machine body 100 includes a CPU 10 and a memory controller 20 connected thereto. Furthermore, in the game machine body 100, the memory controller 20 is connected to a graphics processing unit (GPU) 11, a main memory 17, a DSP 18, and various interfaces (I/F) 21 through 24 and 26. The memory controller 20 controls data transfer among these components.

To start the game, the DVD drive 25 first drives the DVD-ROM 300 placed in the game machine body 100. The game program stored in the DVD-ROM 300 is read through the DVD disk I/F 26 and the memory controller 20 into the main memory 17. With the program on the main memory 17 executed by the CPU 10, the game is started. Then, the player uses the operation switches to enter inputs associated with game operations into the controller 200. With the inputs from the player, the controller 200 outputs operation data to the game machine body 100. The operation data output from the controller 200 is supplied through the controller I/F 21 and the memory controller 20 to the CPU 10. The CPU 10 performs game processing in accordance with the supplied operation data. The GPU 11 and the DSP 18 are used for generating image data and the like in game processing. The sub-memory 19 is used by the DSP for carrying out specific processing.

The GPU 11 includes a geometry unit 12 and a rendering unit 13, and is connected to a memory dedicated to image processing. Such image-processing-dedicated memory is used as, for example, a color buffer 14, a Z buffer 15, or a stencil buffer 16. The geometry unit 12 carries out arithmetic operations for obtaining coordinates of a stereoscopic model for an object or graphics (an object composed of polygons, for example) placed in a virtual 3-D game space. Such arithmetic operations include, for example, rotation, zoom-in, zoom-out, and deformation of the stereoscopic model, and transformation of coordinates from a world coordinate system to a viewpoint coordinate system or a screen coordinate system. The rendering unit 13 is to generate game images by writing color data (RGB data) of the stereoscopic model projected in the screen coordinate system into the color buffer 14 based on predetermined texture. The color buffer 14 is a memory area allocated for retaining game image data (RGB data) generated by the rendering unit 13. The Z buffer 15 is a memory area allocated for retaining depth information from a viewpoint that is lost in transformation from 3-D viewpoint coordinates to two-dimensional (2-D) screen coordinates. The stencil buffer 16 is a memory area allocated for determining a shadowed area by using a shadow volume, which is described further below. The GPU 11 uses these buffers to generate image data to be displayed on the TV monitor 500, and outputs the image data through the memory controller 20 and the video I/F 22 to the TV monitor 500 when appropriate. Sound data generated by the CPU 10 at the time of executing the game program is output from the memory controller 20 through the audio I/F 24 to the loudspeaker 600. In the present embodiment, the game machine body 100 has the hardware structure in which the image-processing-dedicated memory is separately provided. This is not meant to be restrictive. For example, UMA (Unified Memory Architecture) may be used, in which part of the main memory 17 is used as a memory for image processing.

Figure 3:
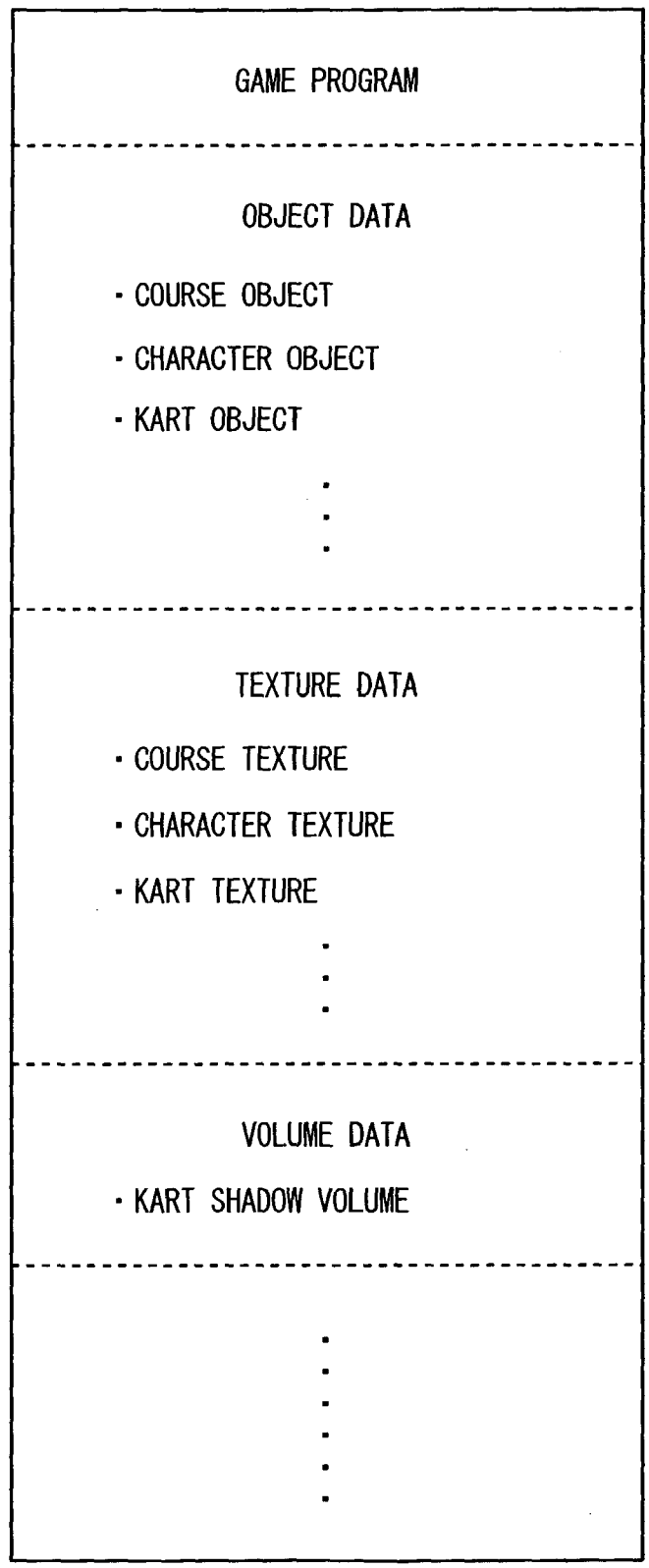
FIG. 3 is an illustration showing a memory map of a DVD-ROM 300.

FIG. 3 illustrates a memory map of the DVD-ROM 300. The DVD-ROM 300 stores the game program, object data, texture data, volume data, and other data. Here, by way of example only, a case where the game program is a program for a kart game is described. The object data includes data such as course objects, character objects, and kart objects. The texture data includes data such as course texture, character texture, and kart texture. The volume data includes data of kart shadow volumes, which is described further below in detail.

The operation of the game system according to the present embodiment is specifically described below.

The CPU 10 of the game machine body 100 executes game processing based on the kart game program stored in the DVD-ROM 300. In this kart game, a plurality of characters ride on karts for running on a course set in a virtual 3-D game space. In the game space, land objects such as ground, buildings, etc., and character objects such as a player character and enemy characters are placed. The positions of the character objects are changed as required according to the progress of the game.

Figure 4:
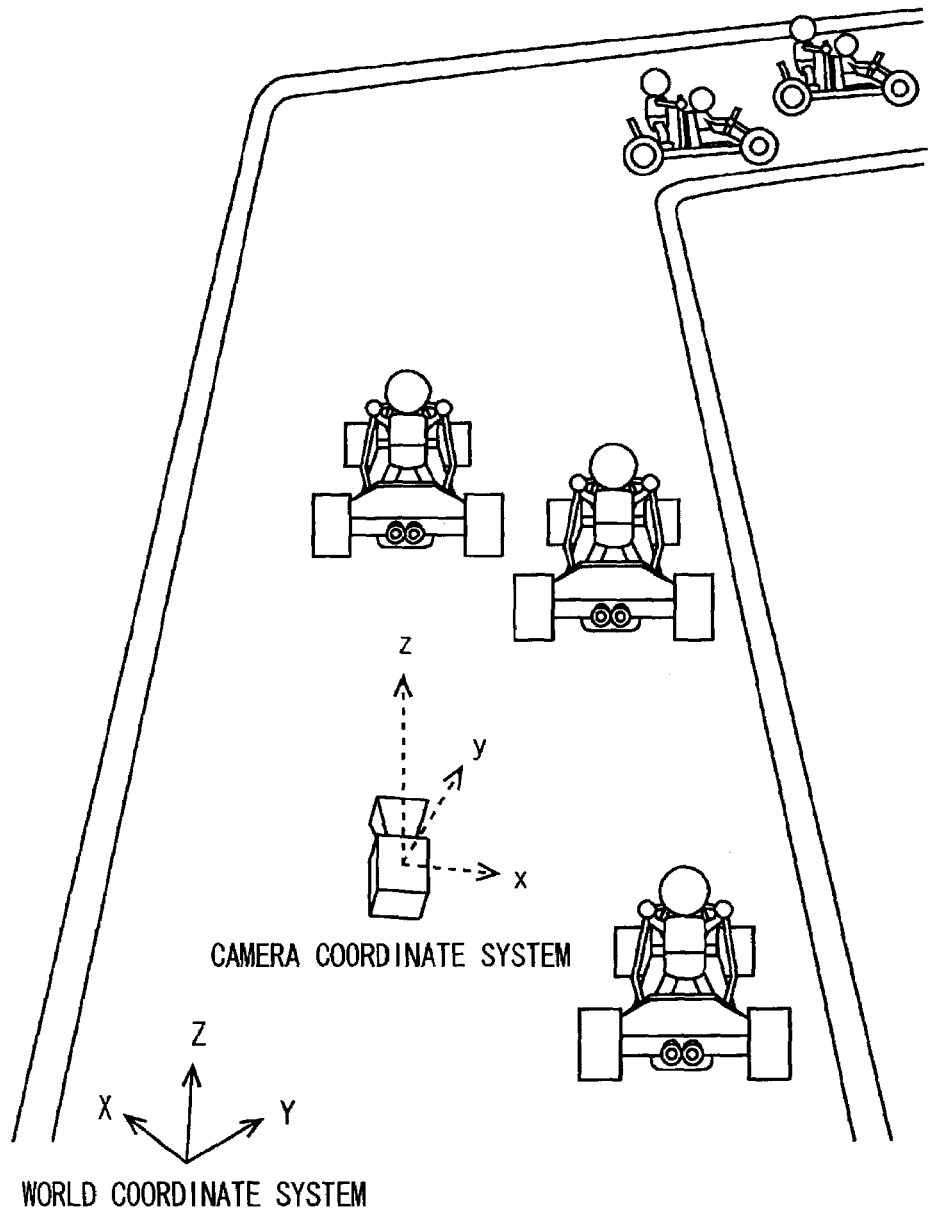
FIG. 4 is an illustration showing a virtual 3-D game space with land objects and character objects arranged thereon.

FIG. 4 illustrates a virtual 3-D game space with the land objects and the character objects placed thereon. The position of each object in the game space is represented in the world game coordinate system. To display this game space on the TV monitor 500, a viewpoint located behind the player character is set in the game space, for example. The coordinates of each object represented in the world coordinate system are transformed into coordinates (camera coordinates) centering on the above-mentioned viewpoint. Then, each object is projected in the 2-D projection plane coordinate system, with color information given thereto based on texture. Simultaneously, a shadow cast from each kart to the course is rendered through shadow rendering processing, which is described further below. As such, a game image is generated for every 1/60 seconds, for example, and is displayed on the TV monitor 500.

Figure 5:
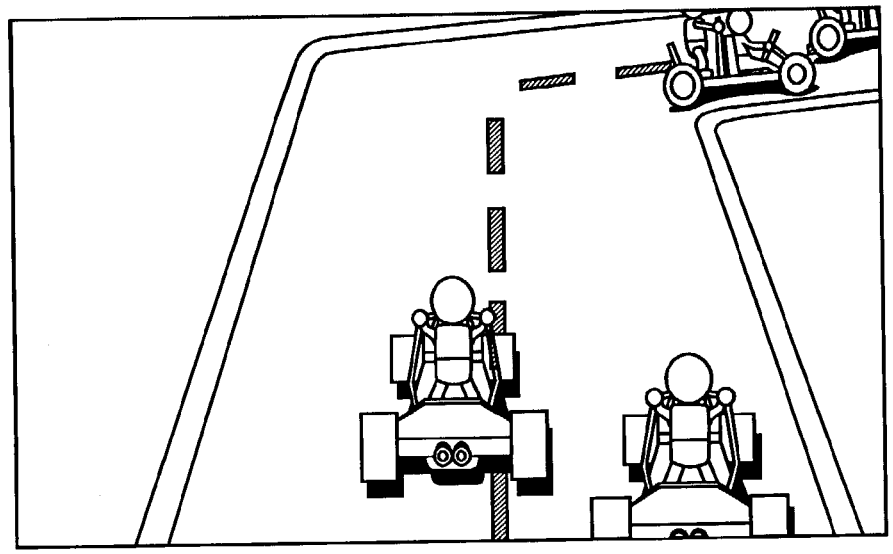
FIG. 5 is an illustration showing one example of a game image displayed on a TV monitor 500.

FIG. 5 illustrates one example of the game images displayed on the TV monitor 500. On the course, the shadow of the kart is displayed. Shadow rendering processing is described below.

In the present embodiment, each kart is provided with a shadow volume in advance (kart shadow volume illustrated in FIG. 3). The shadow volume is a space where an object casts a shadow. In other words, the shadow volume defines a space where light coming from the light source is obstructed by an object. With this shadow volume, it is possible to correctly display a shadow cast over complex terrain. Theoretically, the shadow volume is semi-infinite space obtained by extending each vertex of a shadowing object (here, kart). In the present embodiment, however, such a shadow volume as having a predetermined height based on undulations of terrain in the light direction is used. How to determine this height is described further below in detail. Hereinafter, shadow rendering processing using this shadow volume is briefly described with reference to the drawings.

Figure 6:
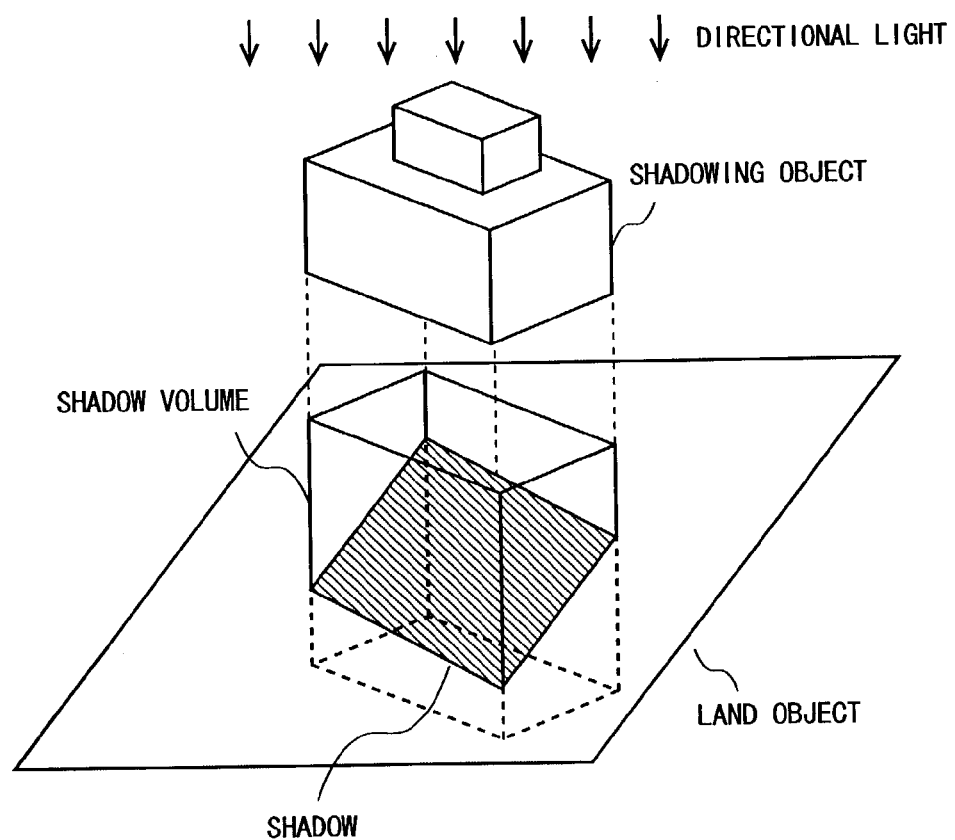
FIG. 6 is an illustration for describing a relation between a shadow volume and a shadow.
Figure 7:
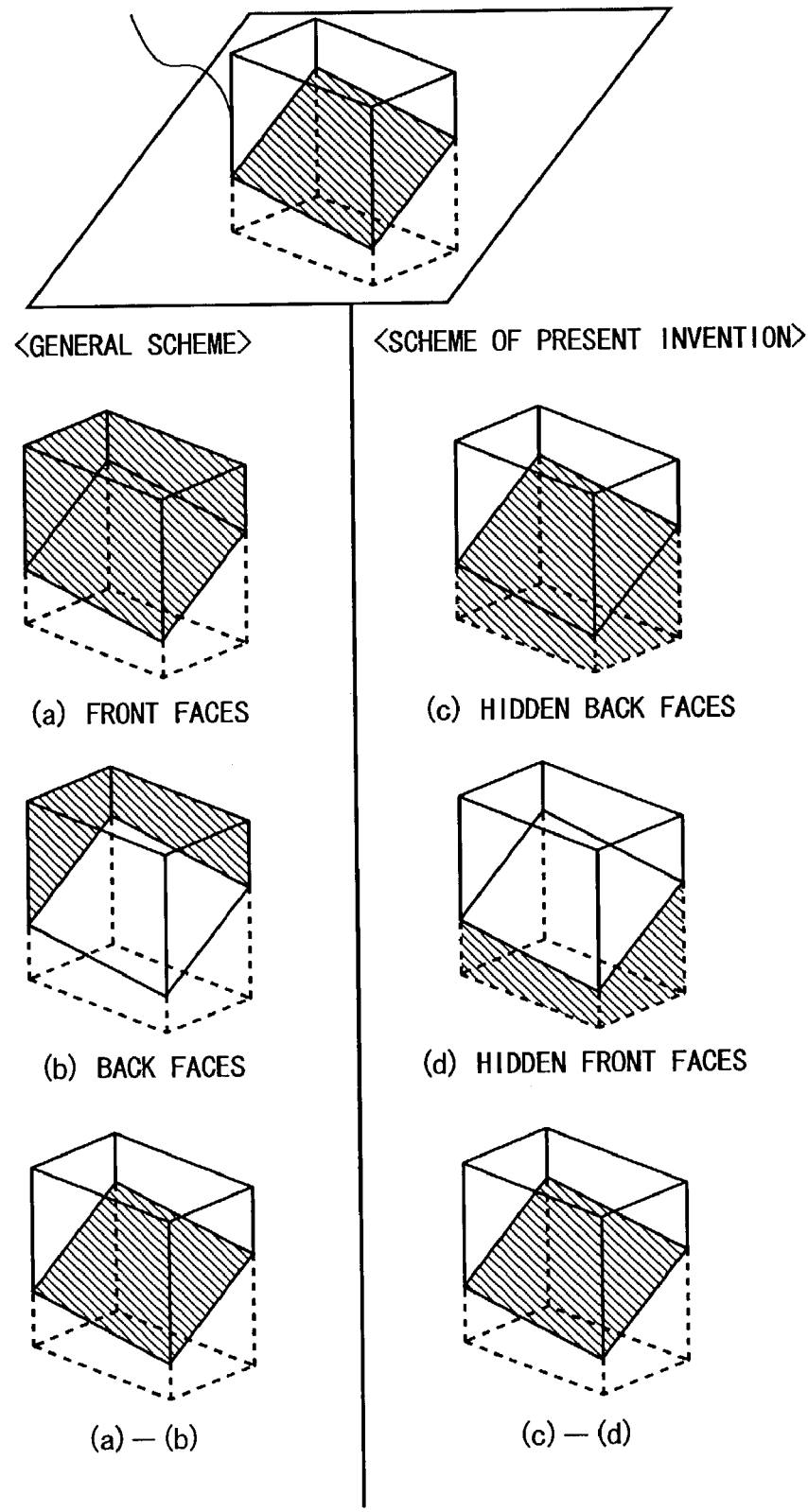
FIG. 7 is an illustration for describing shadow rendering processing using a stencil buffer.

As illustrated in FIG. 6, an area on a land object that meets a shadow volume of a shadowing object is within a shadow, which is hereinafter referred to as a shadowed area. Although FIG. 6 exemplarily illustrates directional light, point light can also be used. The shadowed area can be easily determined by using the stencil buffer. In a general scheme, as illustrated in FIG. 7, (a) front faces of the shadow volume are rendered by using the stencil buffer (incrementing stencil values of the stencil buffer when depth test passes), and then (b) back faces of the shadow volume are rendered by using the stencil buffer (decrementing stencil values of the stencil buffer when depth test passes). As a result, stencil values of the shadowed area become "1", while stencil values of the other area become "0". In this general scheme, however, the stencil values of the shadowed area are not incremented when the viewpoint is set within the shadow volume. Consequently, the shadowed area cannot be correctly determined. To get around this problem, as illustrated in FIG. 7, (c) back faces of the shadow volume that are hidden by another object (here, land object) are rendered by using the stencil buffer (incrementing stencil values of the stencil buffer when depth test fails), and then (d) front faces of the shadow volume that are hidden by the other object are rendered by using the stencil buffer (decrementing stencil values of the stencil buffer when depth test fails). Thus, the shadowed area can be correctly determined even when the viewpoint is set within the shadow volume.

Figure 8:
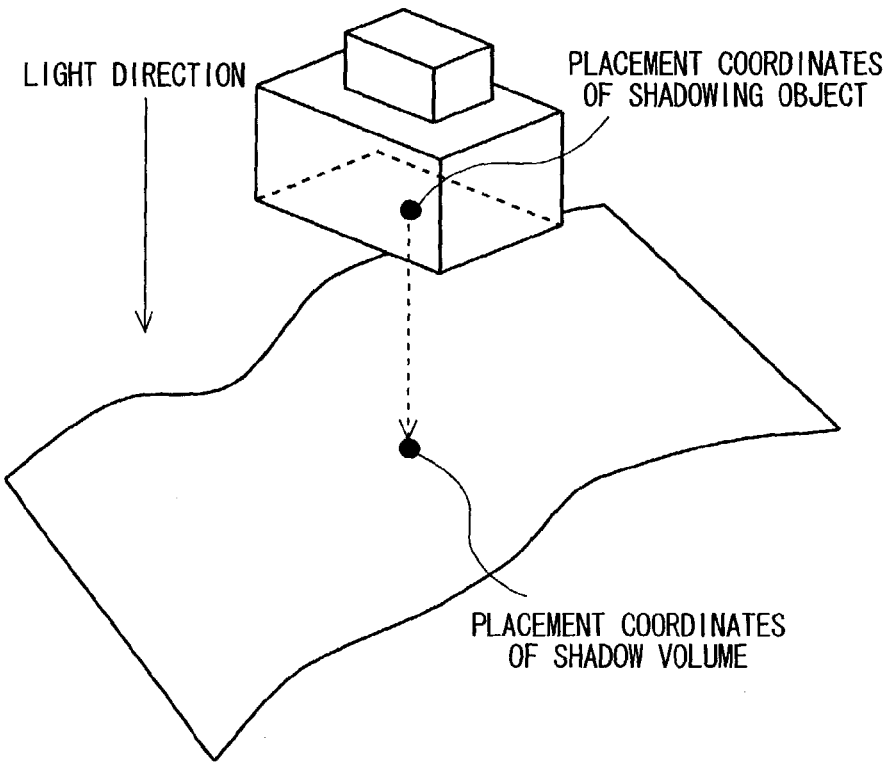
FIG. 8 is an illustration for describing how to determine shadow volume placement coordinates.
Figure 9:
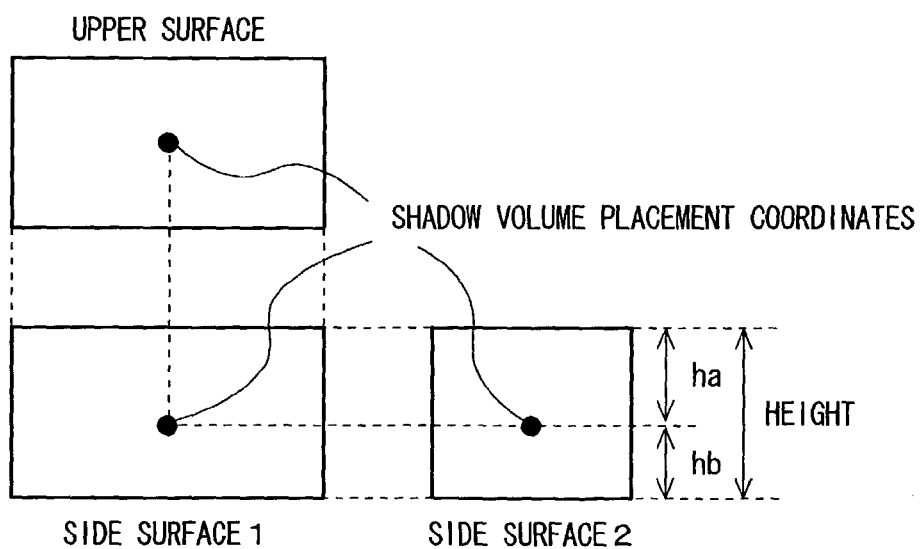
FIG. 9 is an illustration for describing how to define a height of a shadow volume.
Figure 10:
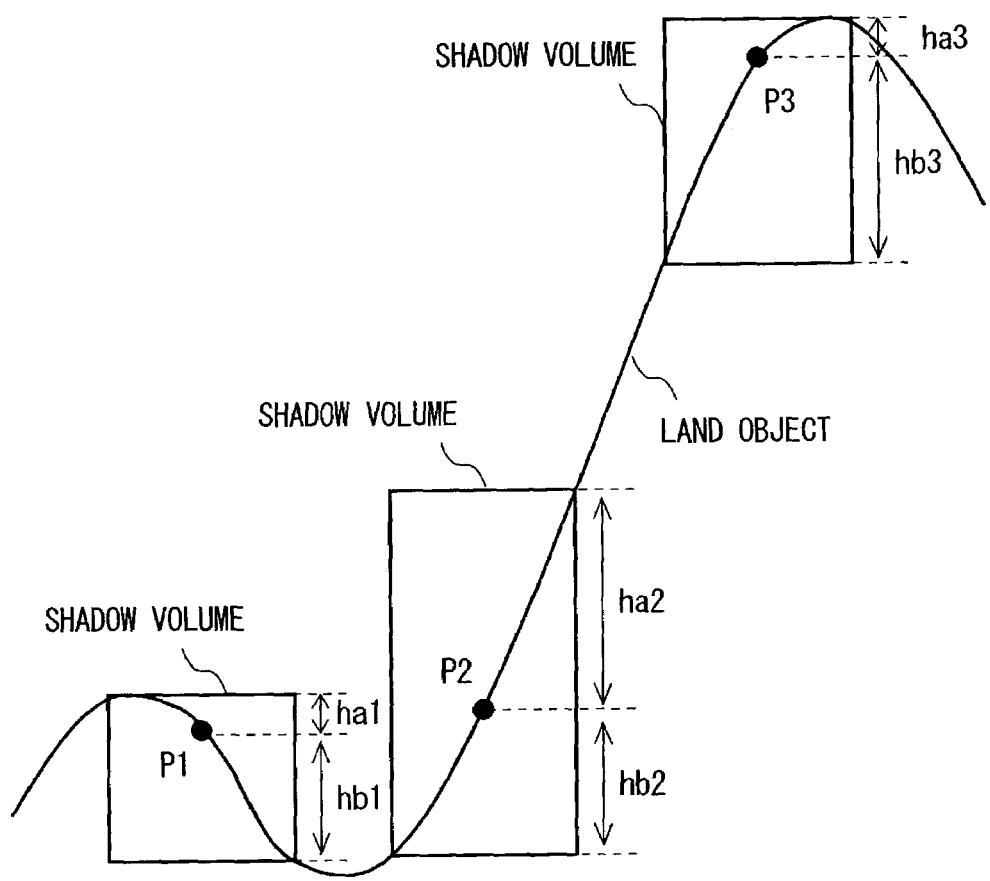
FIG. 10 is an illustration for describing how to determine the height of the shadow volume.

The height of the shadow volume provided in advance is described below. The present embodiment has a feature that the shadow volume having a predetermined height (preferably a minimum-required height) is provided in advance, and is placed on the land object. In the present embodiment, as illustrated in FIG. 8, placement coordinates of a shadowing object (here, kart) is shifted down gradually in the light direction, and a point of intersection of the shifted coordinates and a shadowed object (here, land object) is found for placing a shadow volume thereat. This intersection point is represented by coordinates hereinafter called shadow volume placement coordinates. FIG. 9 illustrates an upper surface and side surfaces of the shadow volume. The height of the shadow volume is defined with reference to the shadow volume placement coordinates. Specifically, as illustrated in FIG. 9, the height of the shadow volume is defined by a light source direction height (hereinafter referred to as "first height") ha from the shadow volume placement coordinates in a direction toward the light source and an inverse light source direction height (hereinafter referred to as "second height") hb therefrom in a direction away from the light source. How to determine the first height ha and the second height hb is described below with reference to FIG. 10. Note that, in FIG. 10, the shadow volume and the land object are illustrated in two dimension.

First, a minimum-required height of the shadow volume from shadow volume placement coordinates P1 in the direction toward the light source and a minimum-required height thereof in a direction away from the light source are found, and are taken as ha1 and hb1, respectively. Then, a minimum-required height of the shadow volume from shadow volume placement coordinates P2 in the direction toward the light source and a minimum-required height thereof in the direction away from the light source are found, and are taken as ha2 and hb2, respectively. Similarly, the shadow volume placement coordinates are sequentially changed and, every time a change occurs, minimum-required heights of the shadow volume in the direction toward the light source and in the direction opposite away therefrom are respectively found. Such operation is hereinafter called sampling operation, and is conducted for every point that can be set as the shadow volume placement coordinates. Here, the number of such points is assumed to be N. For example, when the course is located between high cliffs and therefore the karts would not possibly go out of the course, points located outside the course are excluded for the sampling operation. As a result of such sampling operation, N values of the height in the direction toward the light source {ha1, ha2, ha3, ..., haN} are obtained. Also, N values of the height in the direction away from the light source {hb1, hb2, hb3, ..., hbN} are obtained. From the obtained N values of both heights, a maximum value is respectively selected. The maximum values selected in the above-described manner become values of the first height ha and the second height hb both to be provided in advance. This determination scheme is merely an example. Alternatively, another scheme may be used for determining the first height ha and the second height hb as long as the same results can be obtained.

In one simplified determination scheme, minimum required heights H1 through HN (here, H1=ha1+hb1, H2=ha2 +hb2, H3=ha3+hb3, ..., HN=haN+hbN) of the shadow volume are first found at shadow volume placement coordinates P1 through PN. Of the found heights, a maximum value is commonly used for the first height ha and the second height hb. According to this scheme, the height in the direction toward the light source and the height in the direction away from the light source do not have to be obtained separately for each of the shadow volume placement coordinates P1 through PN. Only required here is to calculate a maximum undulation (in the light direction) within an area cast with a shadow of the kart. Therefore, the height of the shadow volume can be determined more easily. In this case, however, the minimum-required height of the shadow volume is not necessarily set as the height of the shadow volume. The height of the shadow volume may be set larger than the minimum-required height under particular circumstances, such as those where the light source is a point light source or those where a large undulation (high cliff, for example) is located immediately at a point that can be set as the shadow volume placement coordinates.

The operation of the CPU 10 and the GPU 11 in the present embodiment is described below with reference to flowcharts of FIGS. 11 through 16.

When game processing is started, the CPU 10 places land objects for forming ground (including a course) and buildings at their initial coordinates in the world coordinate system (step S1101). Then, character objects including a player character and enemy characters and a virtual camera are placed at their initial coordinates in the world coordinate system (step S1102). Note that, although the character objects and the kart objects are separately illustrated in FIG. 3, both objects are simply called herein "character objects" without distinction. The CPU 10 then determines whether there is any input from the controller 200 (step S1103). If there is any input, the CPU 10 updates, based on the input, the positional coordinates of the player character (including those of the kart driven by the player character) and the positional coordinates of the virtual camera (step S1104) The procedure then goes to step S1105. If there is no input in step S1103, on the other hand, the procedure goes directly to step S1105. In step S1105, the CPU 10 also updates the positional coordinates of the enemy characters in the world coordinate system. When updating of the positional coordinates of each character and the virtual camera is completed, shadow volume processing is started (step S1106), wherein a shadow volume is located in the world coordinate system. Shadow volume processing is described further below in detail.

When placing of the shadow volume in the world coordinate system is completed, the GPU 11 transforms the positional coordinates of the character objects, the land objects, and the shadow volume from the world coordinate system to the camera coordinate system with reference to the position of the virtual camera (step S1107) The GPU 11 then further transforms these coordinates from the camera coordinate system to the 2-D projection plane coordinate system (step S1108). At this time, clipping processing and texture specifying processing are also performed.

When transformation of the positional coordinates is completed, game image generation processing is started (step S1109), wherein game images to be displayed on the TV monitor 500 are generated. This game image generation processing is described further below in detail. The game images generated in step S1109 are displayed on the TV monitor 500 (step S1110) The CPU 10 then determines whether the game ends (step S1111). If the game ends, game processing ends.

Figure 11:
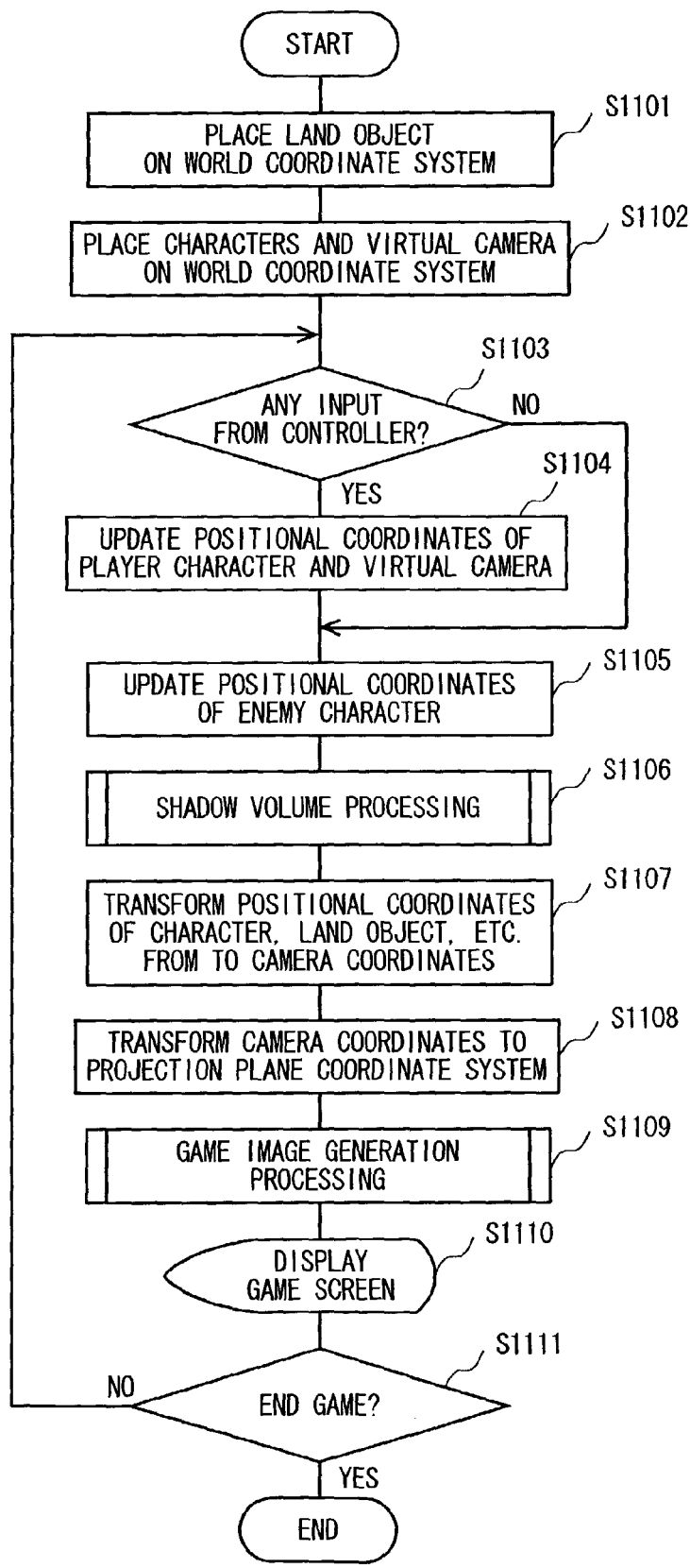
FIG. 11 is a flowchart showing a flow of the entire game processing.
Figure 12:
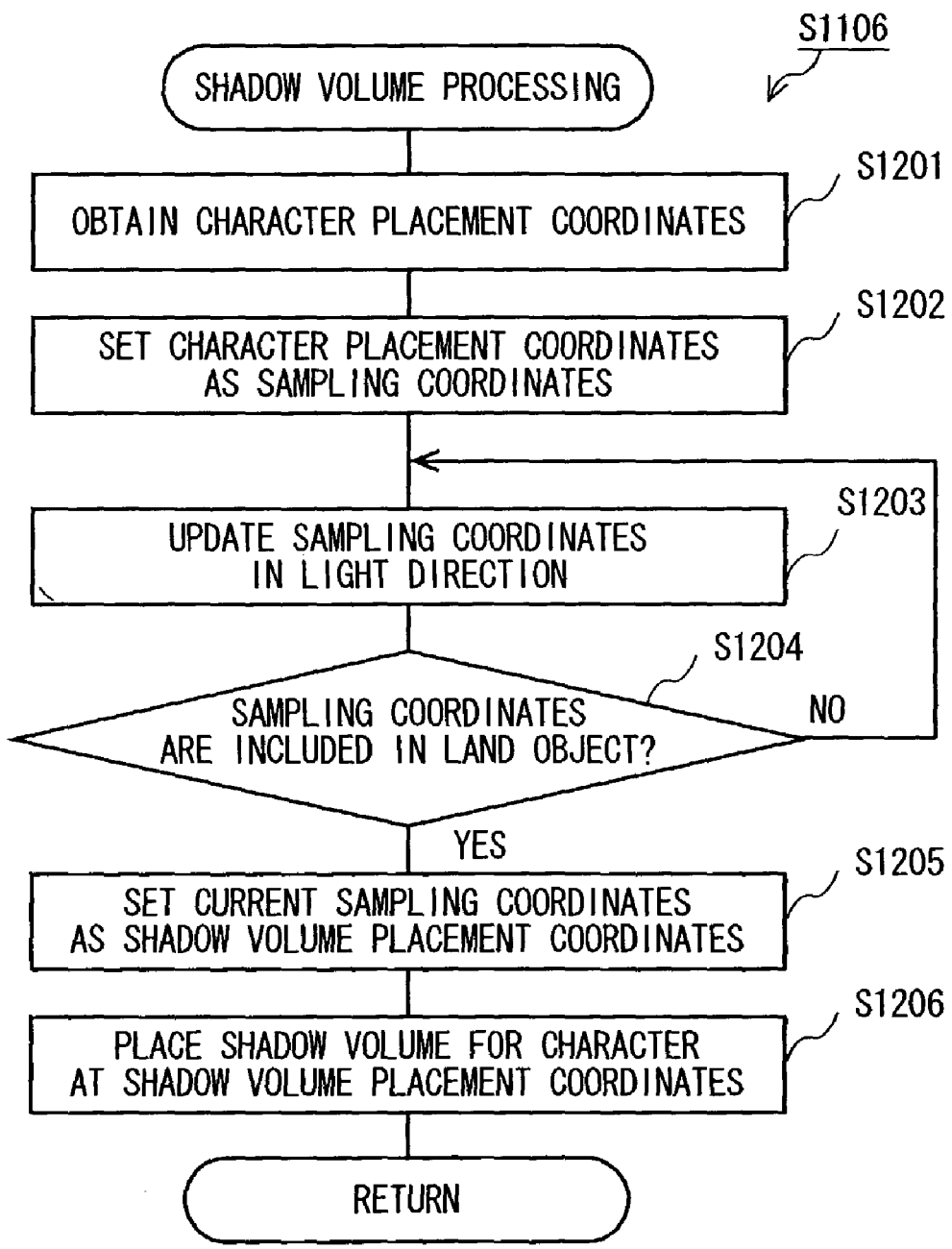
FIG. 12 is a flowchart showing a flow of shadow volume processing.

With reference to FIG. 12, shadow volume processing in step S1106 shown in FIG. 11 is described below in detail.

When shadow volume processing is started, the CPU 10 obtains the placement coordinates of a shadowing object (character object, for example) in the world coordinate system (step S1201). Then, the placement coordinates of the character object obtained in step S1201 are set as sampling coordinates (step S1202). The sampling coordinates are then updated so as to be shifted in the light direction (step S1203). It is then determined whether the sampling coordinates are included in a shadowed object (land object) after updating of the sampling coordinates (step S1204). If the sampling coordinates are not included in the land object, the procedure returns to step S1203, wherein the sampling coordinates are further shifted in the light direction. Steps S1203 and S1204 are repeated until the sampling coordinates are included in the land object.

In step S1204, if it is determined that the sampling coordinates are included in the land object, the CPU 10 sets the current sampling coordinates as shadow volume placement coordinates (step S1205). Then, the shadow volume provided in advance corresponding to the shadowing object is placed at the shadow volume placement coordinates set in step S1205 (step S1206). Then, shadow volume processing ends.

Figure 13:
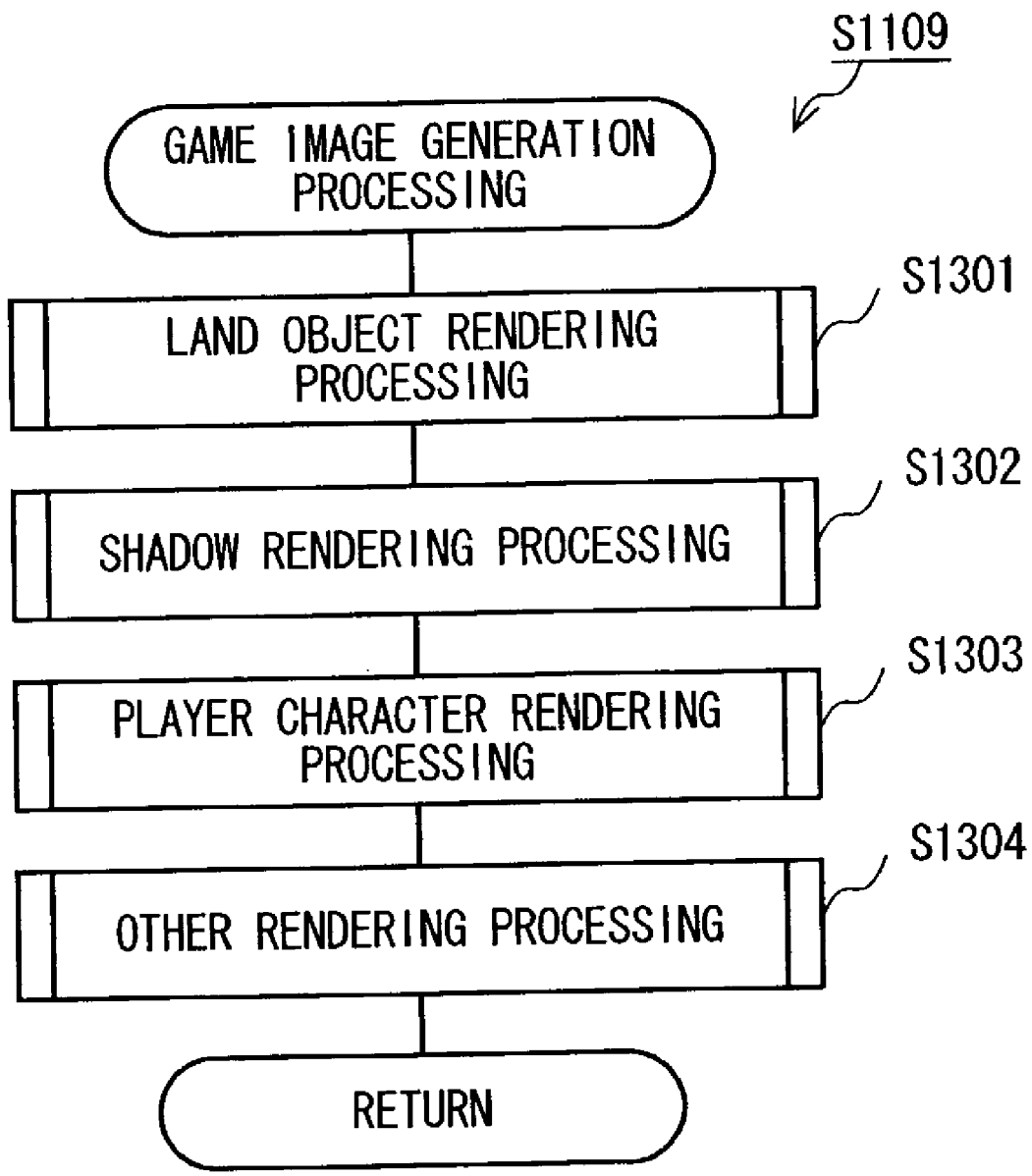
FIG. 13 is a flowchart showing a flow of game image generation processing.

With reference to FIG. 13, game image generation processing in step S1109 of FIG. 11 is described below in detail.

When game image generation processing is started, the GPU 11 performs land object rendering processing (step S1301), which is described further below in detail. When land object rendering is completed, shadow rendering processing for rendering a shadow cast on the land object is performed (step S1302), which is described further below in detail. When shadow rendering is completed, the GPU 11 performs player character rendering processing (step S1303), which is described further below in detail. Then, processing of rendering enemy characters, items, and others (hereinafter referred to as "other rendering processing") is performed (step S1304), which is described further below in detail. Then, game image generation processing ends. Hereinafter, each of the steps of game image generation processing is described in detail.

Figure 14:
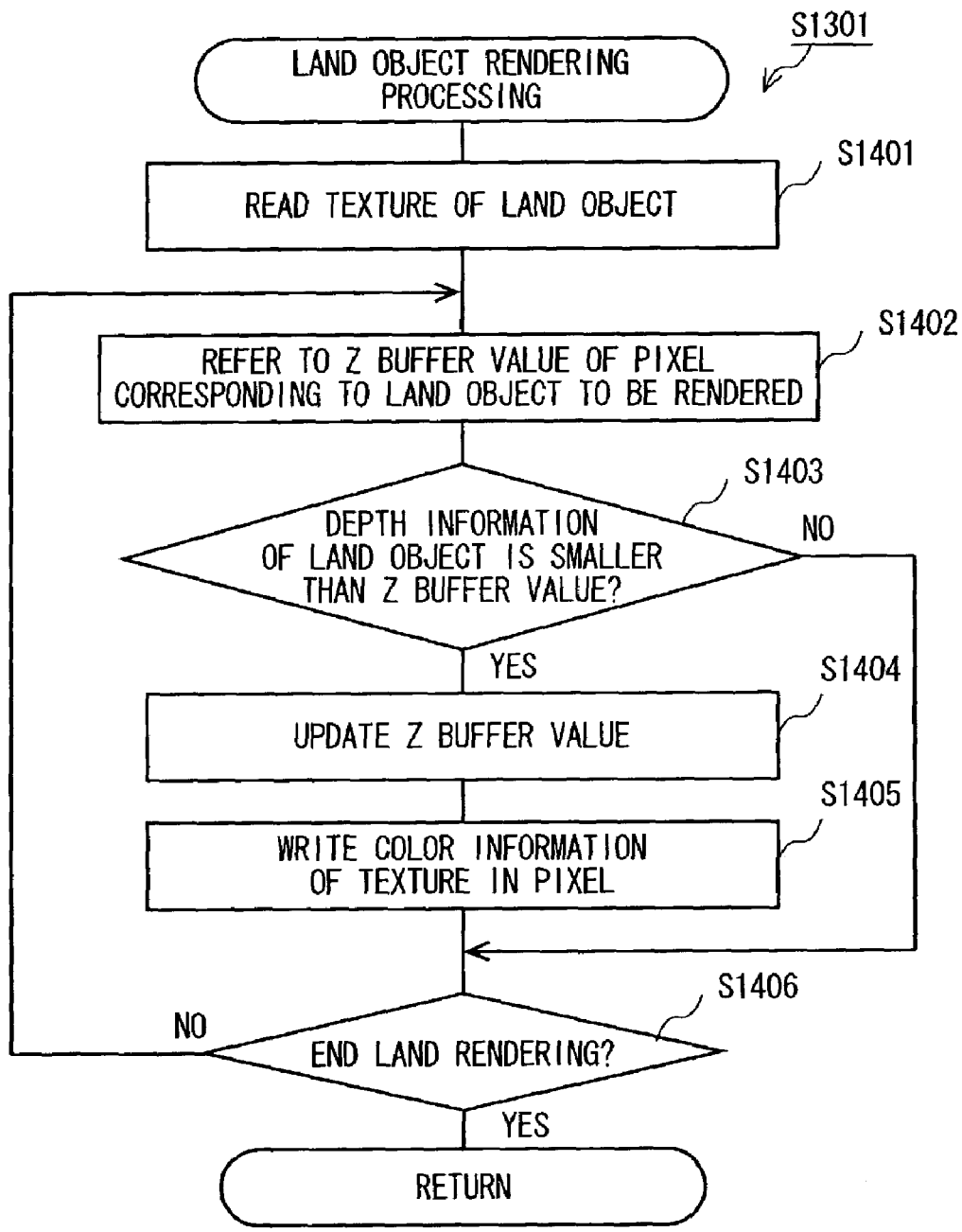
FIG. 14 is a flowchart showing a flow of land object rendering processing.

First, with reference to FIG. 14, land object rendering processing in step S1301 of FIG. 13 is described in detail.

When land object rendering processing is started, the GPU 11 reads the texture of each of the land objects, such as ground and buildings (step S1401). Then, by referring to the Z buffer 15 to find a Z buffer value of each pixel corresponding to a portion where the land object is to be rendered in the projection plane coordinate system (step S1402), it is determined, pixel by pixel, whether a depth information value of the portion is smaller than the corresponding Z buffer value (step S1403). If the depth information value is smaller than the Z buffer value, the Z buffer value of that pixel is updated (step S1404). Then, texture color information is written in an area corresponding to that pixel in the color buffer 14 (step S1405). The procedure then goes to step S1406. If the depth information value is not smaller than the Z buffer value, the procedure goes to step S1406. In step S1406, the GPU 11 determines whether land rendering has ended. If it has not ended, the procedure returns to step S1402. If it has ended, the procedure goes to shadow rendering processing.

Figure 15:
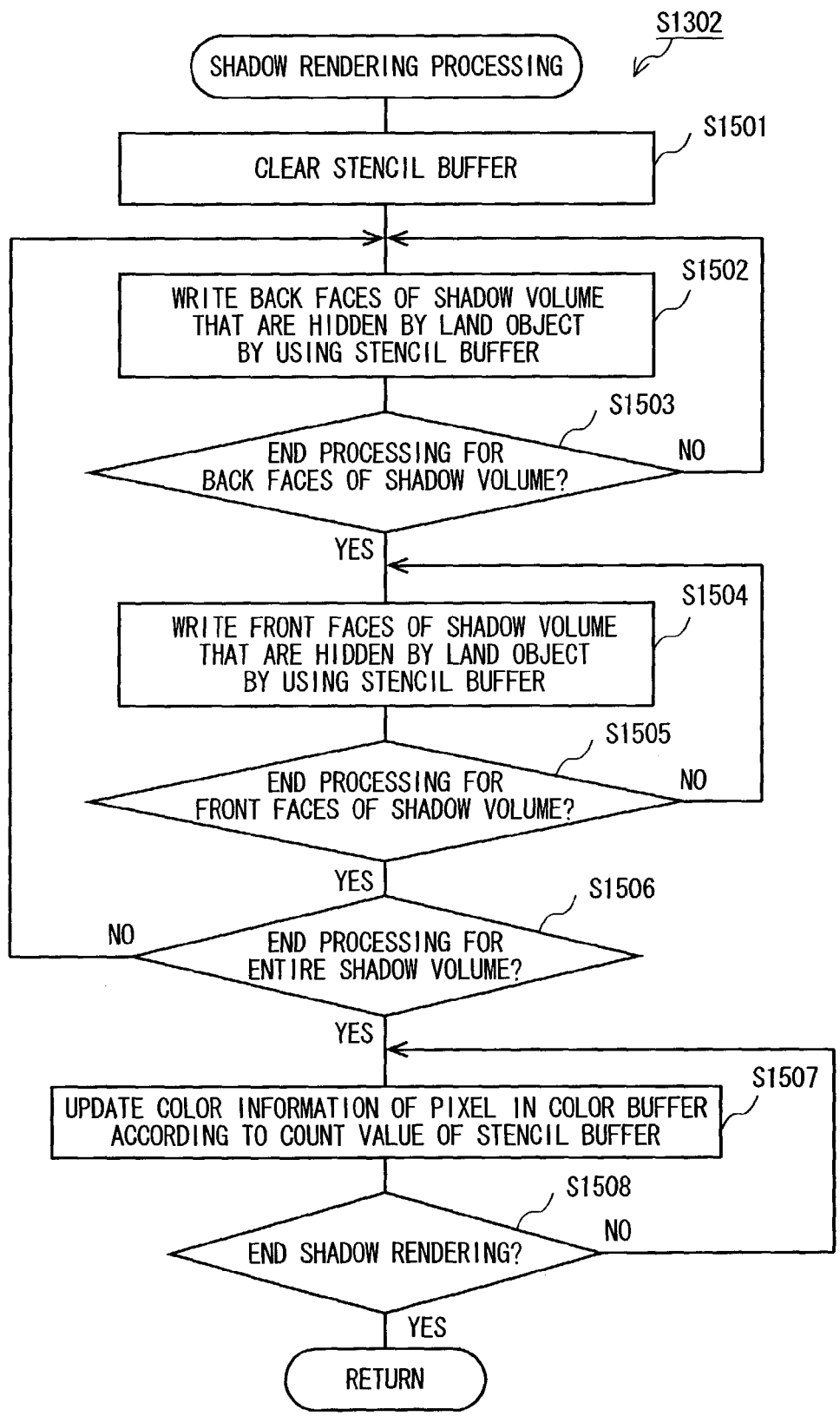
FIG. 15 is a flowchart showing a flow of shadow rendering processing.

With reference to FIG. 15, shadow rendering processing in step S1302 of FIG. 13 is described in detail.

When shadow rendering processing is started, the GPU 11 clears the stencil buffer (non-display buffer) 16 (step S1501). Then, by referring to the Z buffer 15, back faces of the shadow volume that are hidden by the land object are rendered by using the stencil buffer 16 (step S1502). Here, color information is not written, and only a count value of each pixel in the stencil buffer 16 is incremented. Then, it is determined whether processing for the back faces of the shadow volume has ended (step S1503). If processing has ended, the procedure goes to step S1504. If processing has not ended, the procedure returns to step S1502. In step S1504, the GPU 11 renders front faces of the shadow volume that are hidden by the land object by using the stencil buffer 16. Here, again, color information is not written, and only the count value of each pixel in the stencil buffer 16 is decremented. Then, it is determined whether processing for the front faces of the shadow volume has ended (step S1505). If processing has ended, the procedure goes to step S1506. If processing has not ended, the procedure returns to step S1504. In step S1506, it is determined whether the entire shadow volume has been rendered by using the stencil buffer 16. If it is determined that the entire shadow volume has been rendered, the procedure goes to step S1507. If it is determined that the entire shadow volume has not yet been rendered, the procedure returns to step S1502. The GPU 11 then refers to the count value of each pixel in the stencil buffer 16 to update the color information (RGB) of each pixel in the color buffer 14. For example, the color information of the color buffer 14 is changed so that color of a portion represented by pixels whose count values are equal to or more than 1 (that is, a shadowed portion) becomes darker, thereby rendering the shadow. It is then determined whether shadow rendering is completed (step S1508). If shadow rendering processing is completed, the procedure goes to player character rendering processing.

Figure 16:
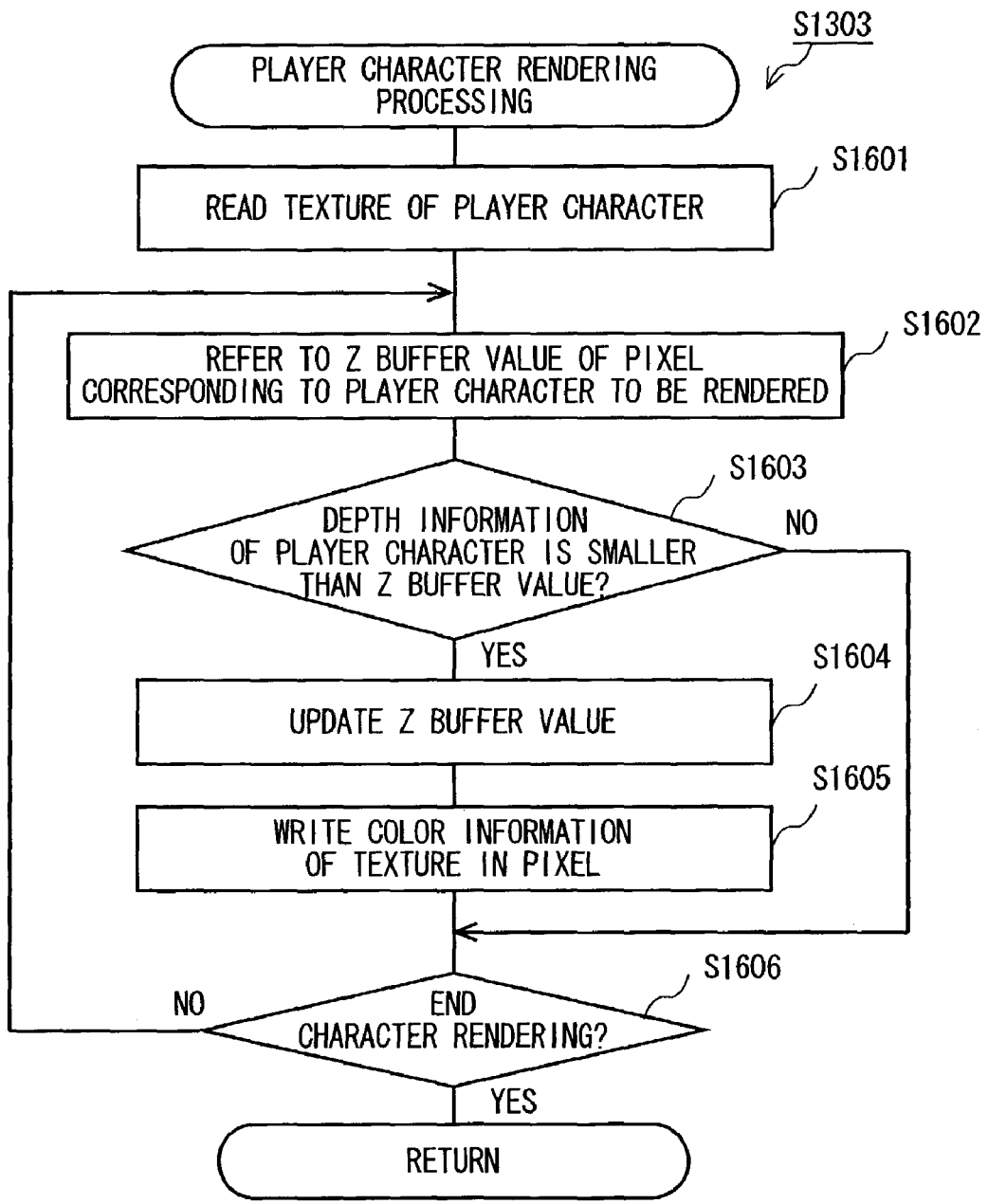
FIG. 16 is a flowchart showing a flow of player character rendering processing.

With reference to FIG. 16, player character rendering processing in step S1303 of FIG. 13 is described in detail.

When player character rendering processing is started, the GPU 11 reads the texture of the player character (step S1601) Then, by referring to the Z buffer 15 to find a Z buffer value of each pixel corresponding to a portion where the player character is to be rendered in the projection plane coordinate system (step S1602), it is determined, pixel by pixel, whether a depth information value of the portion is smaller than the corresponding Z buffer value (step S1603). If the depth information value is smaller than the Z buffer value, the Z buffer value of that pixel is updated (step S1604). Then, texture color information is written in an area corresponding to that pixel in the color buffer 14 (step S1605). The procedure then goes to step S1606. If it is determined in step S1603 that the depth information value is not smaller than the Z buffer value, the procedure directly goes to step S1606. In step S1606, the GPU 11 determines whether player object rendering has ended. If it has not ended, the procedure returns to step S1602. If it has ended, the procedure goes to other object rendering processing.

Details on the other rendering processing in step S1304 of FIG. 13 are basically the same as those in the above-mentioned player character rendering processing, and therefore are not described herein.

As such, in the present exemplary embodiment, a shadow volume having a predetermined height corresponding to the undulations of the land object is provided in advance and, based on this shadow volume, shadow rendering processing is performed. Therefore, the size of the shadow volume to be rendered using the stencil buffer 16 for determining a shadowed area can be reduced compared with conventional art, thereby reducing processing load required for shadow rendering processing (steps S1502 and S1504 of FIG. 15). Consequently, it is possible for the game machine to render a realistic shadow without impairing the entertainment aspect of the game.

In the present embodiment, the game program is supplied to the game machine body 100 through the DVD-ROM 300. This is not meant to be restrictive. Alternatively, the game program may be supplied to the game machine body 100 as being recorded on a computer-readable recording medium, such as a CD-ROM, a MO, a memory card, or an ROM cartridge. Still alternatively, the game program may be included in advance in the game machine body 100. Still alternatively, the game program may be supplied to the game machine body 100 through a communications circuit.

In the present exemplary embodiment, rendering processing is performed by the GPU 11. Alternatively, the CPU 10 may perform such processing.

In the present exemplary embodiment, a case of rendering a shadow formed by directional light has been described. This is not meant to be restrictive. The non-limiting exemplary embodiments can be also applied to a case of rendering a shadow formed by point light. In this case, it is required that the size of the shadow volume be changed based on a positional relation among the point light source, the shadowing object (kart, for example), and the shadowed object (land object, for example). Even so, as with the non-limiting exemplary embodiments, a predetermined height (preferably, minimum-required height) of the shadow volume is set in advance, thereby reducing processing load required for shadow rendering processing compared with conventional art.

In the present exemplary embodiment, the height of the shadow volume is predetermined. In one exemplary modification of the present embodiment, however, the height of the shadow volume may be dynamically determined after the shadow volume placement coordinates are determined. Hereinafter, two exemplary modifications of the present embodiment are described with reference to the drawings.

Figure 18:
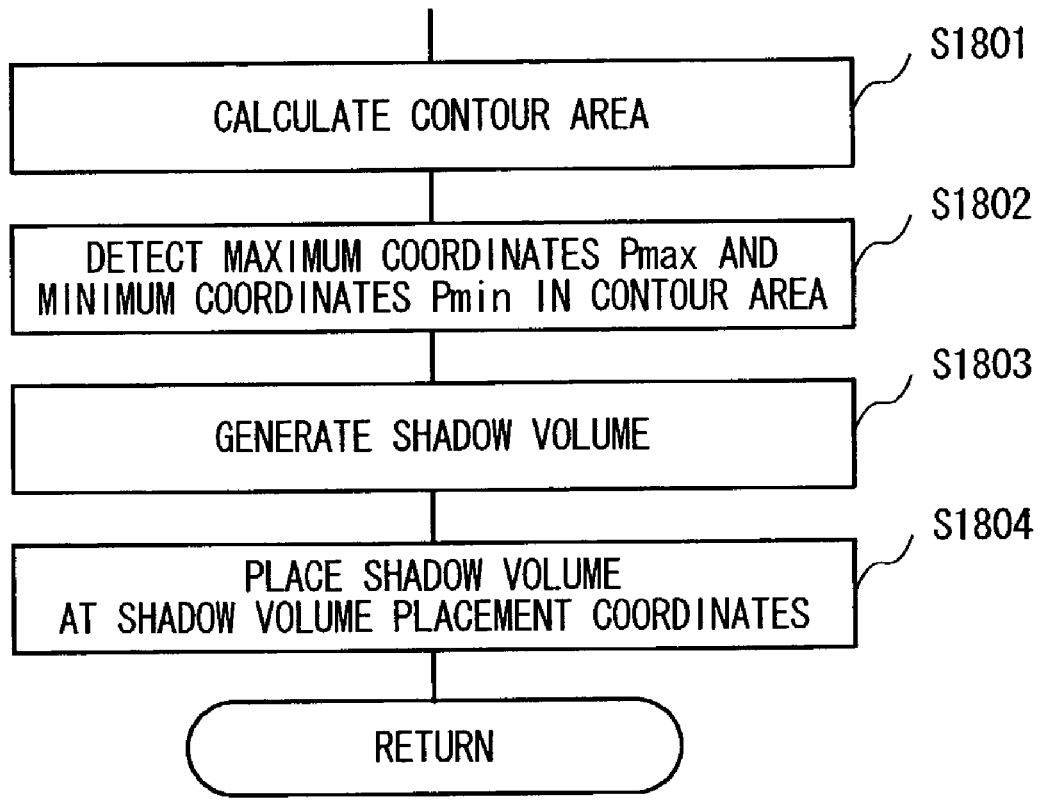
FIG. 18 is a flowchart showing a flow of shadow volume processing in the first exemplary modification.

First, with reference to FIGS. 17 and 18, a first exemplary modification is described. Processing in the first exemplary modification except processing related to shadow volume placement is similar to the above-described exemplary embodiment, and therefore is not described herein. In the first exemplary modification, as illustrated in FIG. 18, after the shadow volume placement coordinates are determined, the CPU 10 calculates a contour area on the land object corresponding to an area surrounded by a contour of the shadowing object based on the shadowing object and the light direction (step S1801). Then, coordinates within the contour area are scanned to detect maximum coordinates Pmax and minimum coordinates Pmin within the contour area (step S1802). Then, the contour area is extended to a width of a maximum undulation (width from the maximum coordinates Pmax to the minimum coordinates Pmin) to generate a shadow volume (step S1803). The generated shadow volume is then placed at the shadow volume placement coordinates (step S1804).

Figure 19:
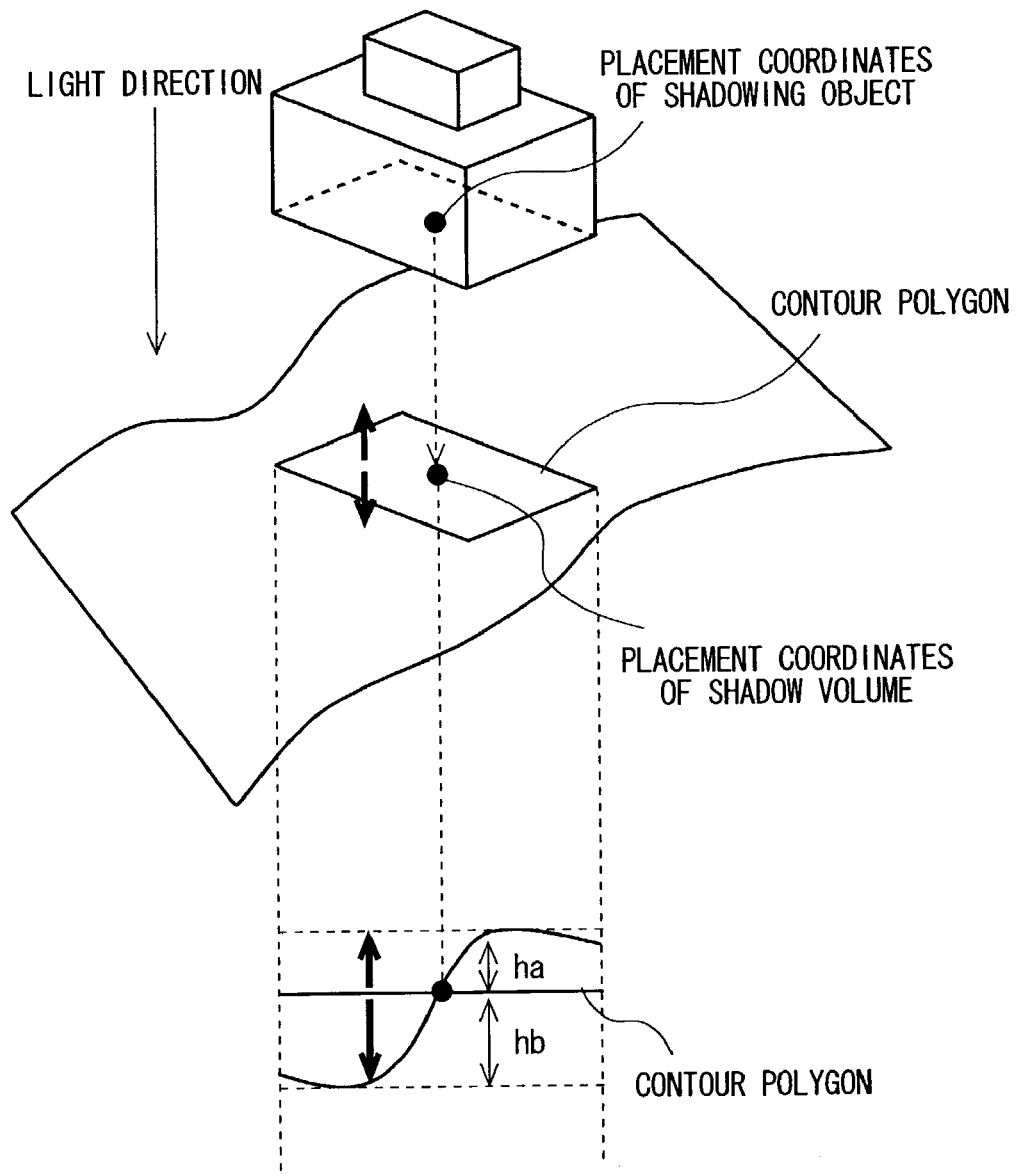
FIG. 19 is an illustration for describing how to generate a shadow volume in a second exemplary modification.
Figure 20:
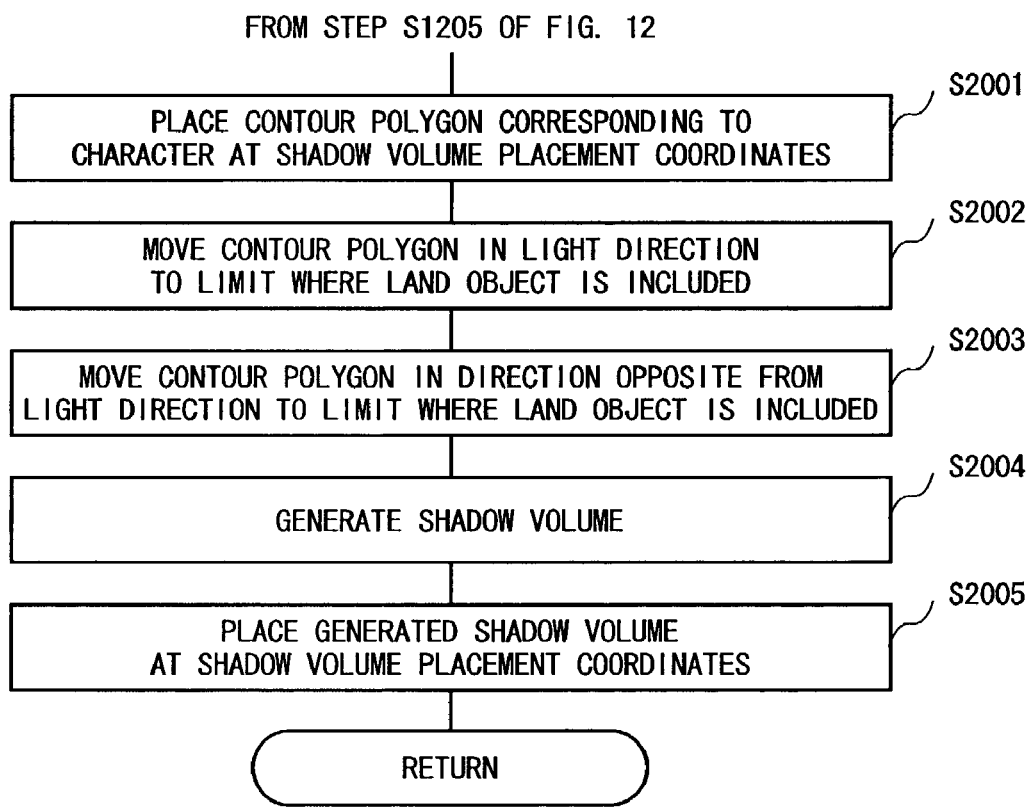
FIG. 20 is a flowchart showing a flow of shadow volume processing in the second exemplary modification.

With reference to FIGS. 19 and 20, a second exemplary modification is described. Processing in the second exemplary modification except processing related to shadow volume placement is similar to the above-described exemplary embodiment, and therefore is not described herein. In the second exemplary modification, as illustrated in FIG. 20, after the shadow volume placement coordinates are determined, the CPU 10 places a contour polygon provided in advance corresponding to the shadowing object at the shadow volume placement coordinates (step S2001). Note that the contour polygon may be provided in advance in a storage such as the DVD-ROM 300, RAM of the game machine body 10, or the like, or may be generated when appropriate and stored in such storage. The contour polygon is moved to a limit where the land object is included (that is, the contour polygon is moved so as to include the above-mentioned maximum coordinates Pmax) in the direction toward the light source (step S2002). Furthermore, the contour polygon is moved to a limit where the land object is included (that is, the contour polygon is moved so as to include the above-mentioned minimum coordinates Pmin) in the direction away from the light source (step S2003). Thereafter, the contour polygon is extended to a width of a maximum undulation (width from the maximum coordinates Pmax to the minimum coordinates Pmin) to generate a shadow volume (step S2004). The generated shadow volume is then placed at the shadow volume placement coordinates (step S2005).

As described above, in the first and second exemplary modifications, the shadow volume is dynamically generated for placement. Therefore, it is possible to generate a shadow volume having a minimum-required height at every appropriate time. Therefore, processing load required for shadow rendering processing (steps S1502 and S1504 of FIG. 15) can be reduced more.

While non-limiting exemplary embodiments have been described in detail, the foregoing description is in all aspects illustrative and not restrictive. It is understood that numerous other modifications and variations can be devised without departing from the scope of the invention.

What is claimed is:

1. A game machine for carrying out game processing to display a state in which a first object casts a shadow formed by light from a light source on a second object in a virtual three-dimensional game space, the game machine comprising:
   partial shadow volume storage locations for storing a partial shadow volume formed based on a contour of the first object and a direction of the light from the light source and having a predetermined height in the direction of the light based on undulations of the second object;
   partial shadow volume placing processing mechanism for placing the partial shadow volume at shadow volume placement coordinates; and
   shadow rendering processing mechanism for rendering the shadow of the first object cast on the second object based on the partial shadow volume placed by the partial shadow volume placing processing mechanism.

2. The game machine according to claim 1, wherein the partial shadow volume placing processing mechanism further includes a shadow volume placement coordinates calculator for calculating, as the shadow volume placement coordinates, a point of intersection of a line extending from predetermined coordinates on the first object in the direction of the light and the second object.

3. The game machine according to claim 1, wherein the height of the partial shadow volume is determined so that, even when a shadowed area of the second object cast with the shadow of the first object is arbitrarily varied in the course of a game, the entire shadowed area is always included inside the parital shadow volume.

4. The game machine according to claim 1, wherein
   the height of the partial shadow volume is defined by a first height in a direction toward the light source with reference to the shadow volume placement coordinates and a second height in a direction away from the light source with reference to the shadow volume placement coordinates, and
   the first height and the second height are determined so that, even when a shadowed area of the second object cast with the shadow of the first object is arbitrarily varied in the course of a game, the entire shadowed area is always included inside the partial shadow volume, and that the first height and the second height are minimum values defining the height of the partial shadow volume.

5. The game machine according to claim 4, wherein
   the first height is determined based on a maximum undulation of the shadowed area that is arbitrarily varied in the course of the game in the direction toward the light source with reference to the shadow volume placement coordinates, and
   the second height is determined based on a maximum undulation of the shadowed area that is arbitrarily varied in the course of the game in the direction away from the light source with reference to the shadow volume placement coordinates.

6. The game machine according to claim 4, wherein the first height and the second height are commonly determined based on a maximum undulation of the shadowed area that is arbitrarily varied in the course of the game.

7. The game machine according to claim 1, wherein the partial shadow volume storage locations store the partial shadow volume formed in advance of the game processing based on the undulations of the second object.

8. The game machine according to claim 1, further comprising: a maximum undulation calculator for calculating a maximum undulation of a shadowed area of the second object cast with the shadow of the first object; and
   a partial shadow volume generator for generating the partial shadow volume having a height corresponding to the maximum undulation calculated by the maximum undulation calculator, and causing the partial shadow volume to be stored in the partial shadow volume storage locations.

9. The game machine according to claim 8, wherein the maximum undulation calculator detects maximum coordinates of the shadowed area that are furthest from the shadow volume placement coordinates in the direction toward the light source and minimum coordinates of the shadowed area that are furthest from the shadow volume placement coordinates in the direction away from the light source, and determines the height of the partial shadow volume based on the detected maximum coordinates and the detected minimum coordinates.

10. The game machine according to claim 9, further comprising contour polygon storage locations for storing a contour polygon corresponding to a contour of the first object projected in the direction of the light, wherein the maximum undulation calculator detects the maximum coordinates and the minimum coordinates by placing the contour polygon at the shadow volume placement coordinates, and then shifting the contour polygon to the direction of the light and the direction opposite from the direction of the light.

11. The game machine according to claim 10, further comprising contour polygon generator for generating the contour polygon based on the contour of the first object and the light coming from the light source, and causing the contour polygon to be stored in the contour polygon storage locations.

12. A computer readable medium encoded with a game program to be executed on a game machine for carrying out game processing to display a state in which a first object casts a shadow formed by light from a light source on a second object in a virtual three-dimensional game space, the game program to cause the game machine to execute steps comprising:
   reading a partial shadow volume formed based on a contour of the first object and a direction of the light from the light source and having a predetermined height in the direction of the light based on undulations of the second object;
   placing the partial shadow volume at shadow volume placement coordinates; and
   rendering the shadow of the first object cast on the second object based on the partial shadow volume placed in partial shadow volume placing step.

13. The computer readable medium according to claim 12, wherein the partial shadow volume placing step further includes a step of calculating, as the shadow volume placement coordinates, a point of intersection of a line extending from predetermined coordinates on the first object in the direction of the light and the second object.

14. The computer readable medium according to claim 12, wherein the height of the partial shadow volume is determined so that, even when a shadowed area of the second object cast with the shadow of the first object is arbitrarily varied in the course of a game, the entire shadowed area is always included inside the partial shadow volume.

15. The computer readable medium according to claim 12, wherein
the height of the partial shadow volume is defined by a first height in a direction toward the light source with reference to the shadow volume placement coordinates and a second height in a direction away from the light source with reference to the shadow volume placement coordinates, and
the first height and the second height are determined so that, even when a shadowed area of the second object cast with the shadow of the first object is arbitrarily varied in the course of a game, the entire shadowed area is always included inside the partial shadow volume, and that the first height and the second height are minimum values defining the height of the partial shadow volume.

16. The computer readable medium according to claim 15, wherein
the first height is determined based on a maximum undulation of the shadowed area that is arbitrarily varied in the course of the game in the direction toward the light source with reference to the shadow volume placement coordinates, and
the second height is determined based on a maximum undulation of the shadowed area that is arbitrarily varied in the course of the game in the direction away from the light source with reference to the shadow volume placement coordinates.

17. The computer readable medium according to claim 15, wherein the first height and the second height are commonly determined based on a maximum undulation of the shadowed area that is arbitrarily varied in the course of the game.

18. The computer readable medium according to claim 12, wherein in the partial shadow volume reading step, the partial shadow volume formed in advance of the game processing based on the undulations of the second object is read.

19. The computer readable medium according to claim 12, to cause the game machine to further execute steps comprising:
calculating a maximum undulation of a shadowed area of the second object cast with the shadow of the first object; and
generating the partial shadow volume having a height corresponding to the maximum undulation calculated in the maximum undulation calculating step, temporarily storing the partial shadow volume, and causing the partial shadow volume to be read in the partial shadow volume reading step.

20. The computer readable medium according to claim 19, wherein in the maximum undulation calculating step, maximum coordinates of the shadowed area that are furthest from the shadow volume placement coordinates in the direction toward the light source and minimum coordinates of the shadowed area that are furthest from the shadow volume placement coordinates in the direction away from the light source are detected, the height of the partial shadow volume is determined based on the detected maximum coordinates and the detected minimum coordinates.

21. The computer readable medium according to claim 20, to cause the game machine to further execute a step of reading a contour polygon corresponding to a contour of the first object projected in the direction of the light, wherein
in the maximum undulation calculating step, the maximum coordinates and the minimum coordinates are detected after the contour polygon is placed at the shadow volume placement coordinates and then the contour polygon is shifted to the direction of the light and the direction opposite from the direction of the light.

22. The computer readable medium according to claim 21, to cause the game machine to further execute a step of generating the contour polygon based on the contour of the first object and the light coming from the light source, temporarily storing the contour polygon, and causing the contour polygon to be read in the contour polygon reading step.

23. In a videogame, a method of generating a shadow formed by light from a light source and cast by a character object onto a land object, the method comprising:
storing a partial shadow volume formed based on a contour of the character object and a direction of the light from the light source, the stored partial shadow volume having a predetermined height in the direction of the light based on undulations of the land object;
placing the partial shadow volume at shadow volume placement coordinates; and
rendering the shadow of the character object cast on the land object based on the placed partial shadow volume.

24. The method according to claim 23, wherein
the partial shadow volume placing includes calculating, as the shadow volume placement coordinates, a point of intersection of a line extending from predetermined coordinates on the character object in the direction of the light and the land object.

25. The method according to claim 23, wherein
the height of the partial shadow volume is determined so that, even when a shadowed area of the land object cast with the shadow of the character object is arbitrarily varied in the course of a game, the entire shadowed area is always included inside the partial shadow volume.

26. The method according to claim 23, wherein
the height of the partial shadow volume is defined by a first height in a direction toward the light source with reference to the shadow volume placement coordinates and a second height in a direction away from the light source with reference to the shadow volume placement coordinates, and
the first height and the second height are determined so that, even when a shadowed area of the land object cast with the shadow of the character object is arbitrarily varied in the course of a game, the entire shadowed area is always included inside the partial shadow volume, and that the first height and the second height are minimum values defining the height of the partial shadow volume.

27. The method according to claim 26, wherein
the first height is determined based on a maximum undulation of the shadowed area that is arbitrarily varied in the course of the game in the direction toward the light source with reference to the shadow volume placement coordinates, and the second height is determined based on a maximum undulation of the shadowed area that is arbitrarily varied in the course of the game in the direction away from the light source with reference to the shadow volume placement coordinates.

28. The method according to claim 26, wherein the first height and the second height are commonly determined based on a maximum undulation of the shadowed area that is arbitrarily varied in the course of the game.

29. The method according to claim 23, wherein the partial shadow volume formed in advance of the game processing based on the undulations of the land object is read.

30. The method according to claim 23, further comprising: calculating a maximum undulation of a shadowed area of the land object cast with the shadow of the character object; and generating the partial shadow volume having a height corresponding to the maximum undulation calculated in calculating the maximum undulation, temporarily storing the partial shadow volume, and causing the partial shadow volume to be read.

31. The method according to claim 30, wherein in calculating the maximum undulation, maximum coordinates of the shadowed area that are furthest from the shadow volume placement coordinates in the direction toward the light source and minimum coordinates of the shadowed area that are furthest from the shadow volume placement coordinates in the direction away from the light source are detected, the height of the partial shadow volume is determined based on the detected maximum coordinates and the detected minimum coordinates.

32. The method according to claim 31, further comprising:

reading a contour polygon corresponding to a contour of the character object projected in the direction of the light, wherein in calculating the maximum undulation, the maximum coordinates and the minimum coordinates are detected after the contour polygon is placed at the shadow volume placement coordinates and then the contour polygon is shifted to the direction of the light and the direction opposite from the direction of the light.

33. A game machine for carrying out game processing to display a state in which a first object casts a shadow formed by light from a light source on a second object in a virtual three-dimensional game space, the game machine comprising:

partial shadow volume storage locations for storing a partial shadow volume formed based on a contour of the first object and a direction of the light from the light source and having a predetermined height in the direction of the light;

partial shadow volume placing processing mechanism for placing the partial shadow volume such that a distance between the first object and the partial shadow volume varies depending on relative positions of the first object and the second object; and shadow rendering processing mechanism for rendering the shadow of the first object cast on the second object based on the partial shadow volume placed by the partial shadow volume placing processing mechanism.

34. In a videogame, a method of generating a shadow formed by light from a light source and cast by a first object onto a second object, the method comprising:

storing a partial shadow volume formed based on a contour of the first object and a direction of the light from the light source, the stored partial shadow volume having a predetermined height in the direction of the light;

placing the partial shadow volume such that a distance between the first object and the partial shadow volume varies depending on relative positions of the first object and the second object; and rendering the shadow of the first object cast on the second object based on the placed partial shadow volume.

* * * * *

UNITED STATES PATENT AND TRADEMARK OFFICE
CERTIFICATE OF CORRECTION

PATENT NO. : 7,104,891 B2  
APPLICATION NO. : 10/288303  
DATED : September 12, 2006  
INVENTOR(S) : S. Osako et al.

Page 1 of 1

It is certified that error appears in the above-identified patent and that said Letters Patent is hereby corrected as shown below:

On the first page of the Patent, line (54), please correct the title to read as follows:

--GAME MACHINE AND GAME PROGRAM FOR DISPLAYING A FIRST OBJECT CASTING A SHADOW FORMED BY LIGHT FROM A LIGHT SOURCE ON A SECOND OBJECT IN A VIRTUAL GAME SPACE--.

Signed and Sealed this

Tenth Day of April, 2007

JON W. DUDAS  
*Director of the United States Patent and Trademark Office*